(12) United States Patent
Park et al.

(10) Patent No.: US 10,476,718 B1
(45) Date of Patent: Nov. 12, 2019

(54) SYSTEMS AND METHODS FOR DYNAMICALLY SELECTING A SUB-CARRIER SPACING

(71) Applicant: SPRINT SPECTRUM LP, Overland Park, KS (US)

(72) Inventors: Justin Sungki Park, Ashburn, VA (US); Saied Kazeminejad, Ashburn, VA (US); Durga Prasad Satapathy, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/011,931

(22) Filed: Jun. 19, 2018

(51) Int. Cl.
| | |
|---|---|
| *H04L 27/26* | (2006.01) |
| *H04L 5/00* | (2006.01) |
| *H04W 24/06* | (2009.01) |
| *H04W 72/04* | (2009.01) |

(52) U.S. Cl.
CPC ........ *H04L 27/2602* (2013.01); *H04L 5/0048* (2013.01); *H04W 24/06* (2013.01); *H04W 72/0453* (2013.01); *H04L 5/001* (2013.01)

(58) Field of Classification Search
CPC ... H04L 27/2602; H04L 5/0048; H04L 5/001; H04W 72/0453; H04W 24/06; H04W 72/04; H04W 72/12; H04W 76/00; H04B 7/2121; H04B 7/2123; H04J 2203/0069; H04Q 2213/394

See application file for complete search history.

(56) References Cited

U.S. PATENT DOCUMENTS

| | | | |
|---|---|---|---|
| 8,144,571 B2 | 3/2012 | Lee et al. | |
| 8,432,984 B2 * | 4/2013 | Zhang .................. | H04L 27/265 375/259 |
| 9,160,503 B2 * | 10/2015 | Kim ..................... | H04L 1/0003 |
| 2007/0217490 A1 * | 9/2007 | Blake .................. | H04L 27/2626 375/222 |
| 2008/0285467 A1 * | 11/2008 | Olgaard ............. | H04B 17/0085 370/242 |
| 2018/0048435 A1 | 2/2018 | Islam et al. | |

* cited by examiner

*Primary Examiner* — Sharad Rampuria

(57) ABSTRACT

A system for selecting a sub-carrier spacing includes an access node configured to deploy a radio air interface to provide wireless services to a plurality of wireless devices. The access node includes a processor configured to determine a value of at least one parameter relating to at least one of radio frequency impairment, mobility, and service latency. The processor is also configured to compare the value of the at least one parameter with a predetermined threshold. The processor is further configured to select the sub-carrier spacing from a plurality of sub-carrier spacings based on a result of the comparison.

18 Claims, 7 Drawing Sheets

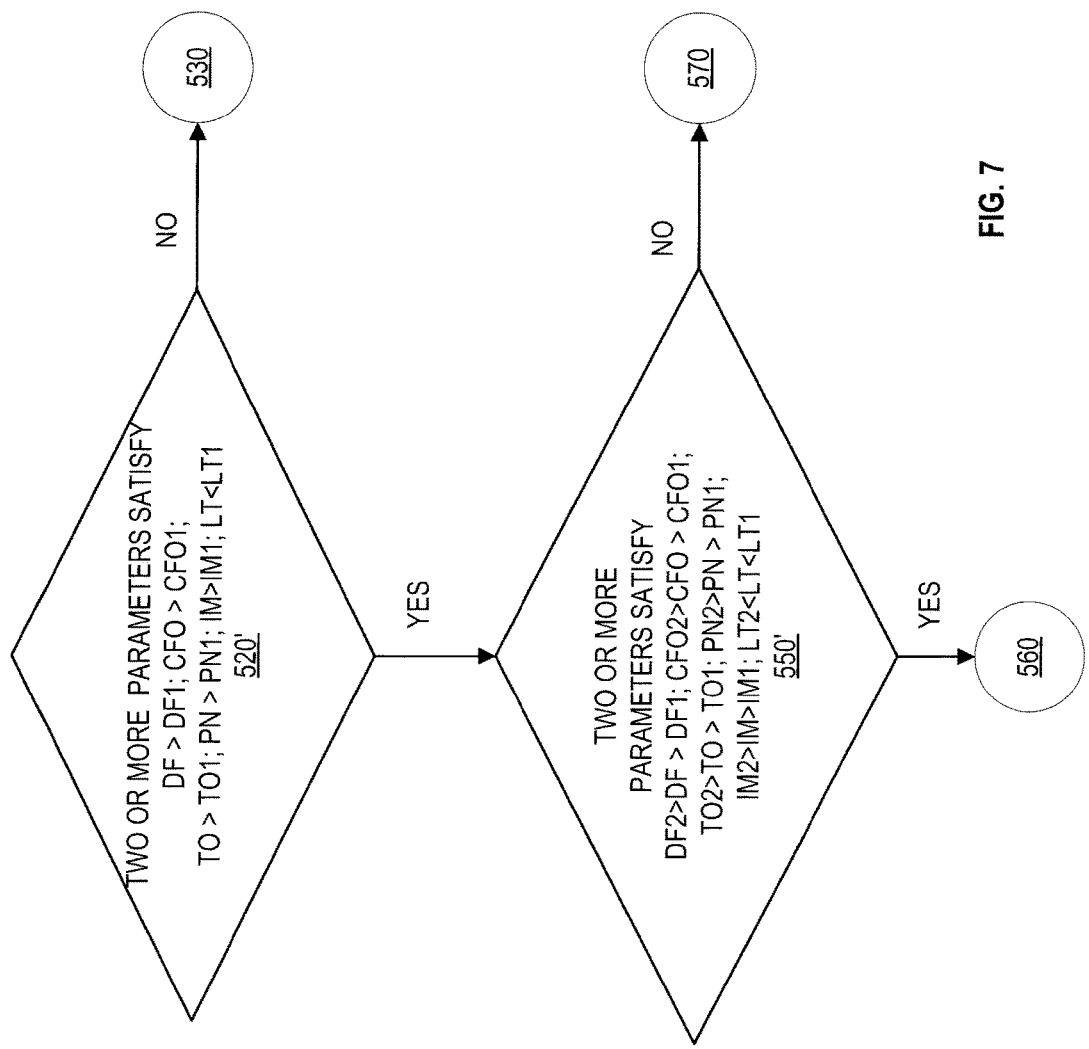

SYSTEMS AND METHODS FOR DYNAMICALLY SELECTING A SUB-CARRIER SPACING

TECHNICAL BACKGROUND

A wireless network, such as a cellular network, can include an access node serving a number of wireless devices or user equipment in a geographical area covered by a radio frequency transmission of the access node. The access node and the wireless devices may communicate with each other to transmit signals or data using physical resource blocks. Each physical resource block may be associated with a frequency span, such as, for example, 180 kHz. Each physical resource block may include a number of sub-carriers. The sub-carriers are spaced apart by a sub-carrier spacing (hereinafter "SCS"). In some wireless communication systems, such as Long-Term-Evolution (LTE) systems, the sub-carrier spacing is fixed at, e.g., 15 kHz. Fixed sub-carrier spacing imposes restrictions on a system's flexibility in handling dynamically changing demands and communication conditions.

Other communication technologies, such as the fifth generation (5G) New Radio (5G NR) technology, may offer non-fixed sub-carrier spacing in order to increase the flexibility and scalability of the system. For example, the 5G NR community has proposed using a numerology to determine the sub-carrier spacing, allowing the sub-carrier spacing to range from 15 kHz to other spacing values, such as 480 kHz. In 5G NR, the sub-carrier spacing may be calculated from $2^{\mu} \times 15$ kHz, where i is the value of the numerology. When numerology $\mu=0$, the sub-carrier spacing is $2^0 \times 15$ kHz=15 kHz, when numerology $\mu=1$, the sub-carrier spacing is $2^1 \times 15$ kHz=30 kHz, when numerology $\mu=2$, the sub-carrier spacing is $2^2 \times 15$ kHz=60 kHz, when numerology $\mu=3$, the sub-carrier spacing is $2^3 \times 15$ kHz=120 kHz, and when numerology $\mu=4$, the sub-carrier spacing is $2^4 \times 15$ kHz=240 kHz, and so on.

Although the 5G NR uses different values of the sub-carrier spacing based on the value of the numerology, there is still a need for a system and a method that are capable of dynamically selecting sub-carrier spacing based on the changing conditions of communications and the wireless network, such that the system can be more flexible in serving the users of the wireless network.

Overview

Exemplary embodiments described herein include systems, methods, and processing nodes for dynamically selecting a sub-carrier spacing. An exemplary system for selecting a sub-carrier spacing includes an access node configured to deploy a radio air interface to provide wireless services to a plurality of wireless devices. The access node includes a processor configured to determine a value of at least one parameter relating to at least one of radio frequency impairment, mobility, and service latency. The processor is also configured to compare the value of the at least one parameter with a predetermined threshold. The processor is further configured to select the sub-carrier spacing from a plurality of sub-carrier spacings based on a result of the comparison.

An exemplary method described herein for selecting a sub-carrier spacing includes determining a value of at least one parameter relating to at least one of radio frequency impairment, mobility, and service latency. The method also includes comparing the value of the at least one parameter with a predetermined threshold. The method further includes selecting the sub-carrier spacing from a plurality of sub-carrier spacings based on a result of the comparison.

An exemplary processing node described herein for selecting a sub-carrier spacing. The processing node includes a processor configured to perform operations including determining a value of at least one parameter relating to at least one of radio frequency impairment, mobility, and service latency. The operations also include comparing the value of the at least one parameter with a predetermined threshold. The operations further include selecting the sub-carrier spacing from a plurality of sub-carrier spacings based on a result of the comparison.

BRIEF DESCRIPTION OF THE DRAWINGS

FIG. 7 depicts modified portions of the method shown in FIG. 5 for dynamically selecting a sub-carrier spacing, in accordance with the disclosed embodiments.

DETAILED DESCRIPTION

Figure 1:
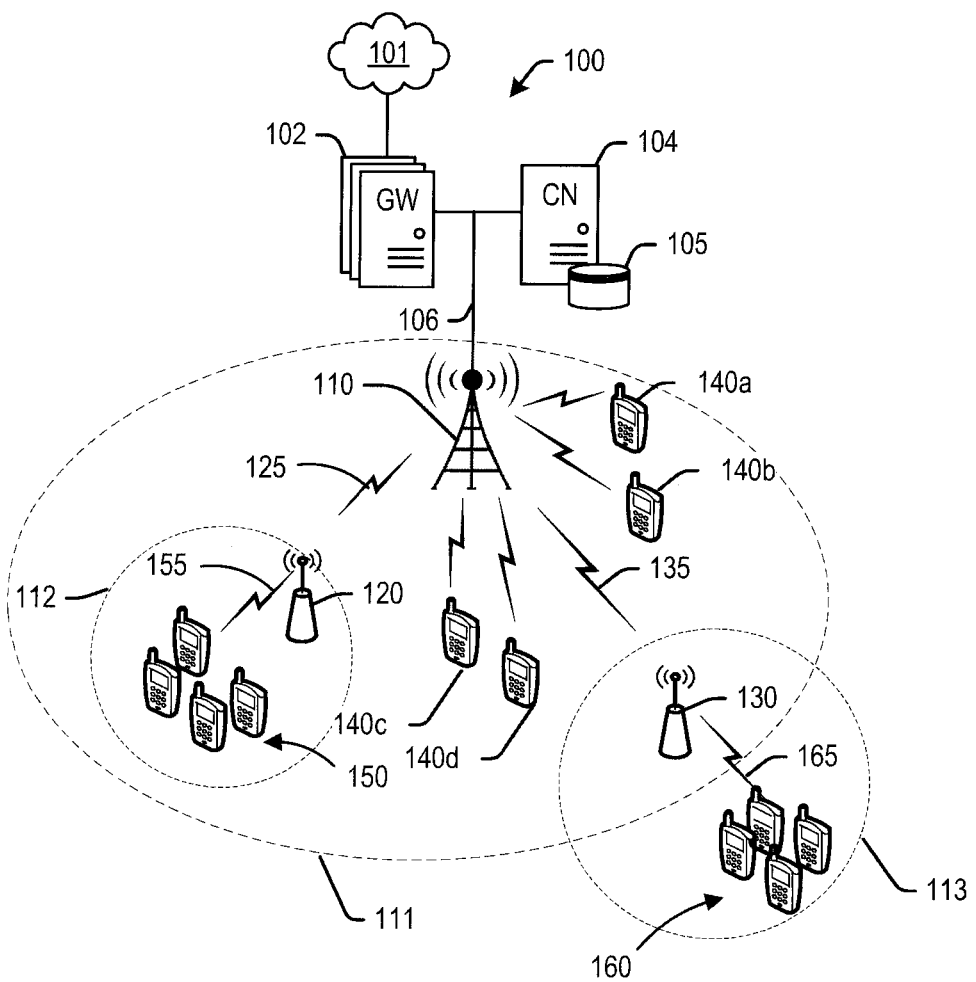
FIG. 1 depicts an exemplary system for wireless communication, in accordance with the disclosed embodiments.

Exemplary embodiments described herein include systems, methods, and processing nodes for dynamically selecting a sub-carrier spacing from a plurality of sub-carrier spacings for a communication session or for a wireless network deployed by an access node (e.g., a base station). The disclosed systems and methods may be implemented in any wireless networks in which two or more sub-carrier spacings are supported by the access node. By dynamically selecting a sub-carrier spacing based on the conditions of the communications and the wireless network, such as the radio frequency impairment (RF impairment), mobility, and/or the latency requirement of the services or applications, data transmission efficiency and reliability may be improved.

Various factors in a communication network may affect the data transmission speed and robustness (or reliability). Some factors may relate to the hardware, such as the hardware of the transmitter and receiver of the base station, some may relate to the environment of the communications (such as weather, obstacles, relative motion between the base station and the wireless devices, etc.), and some may relate to the service requirement, such as the latency requirement of an application or service. Different sub-carrier spacings may be better suited for different conditions and services. For example, a narrower sub-carrier spacing may fit better when RF impairment is lower (e.g., lower frequency offset, lower timing offset, lower IQ mismatch, and lower phase noise). A narrower sub-carrier spacing may also fit better when the mobility is lower (e.g., when the Doppler frequency shift effect is lower). A wider sub-carrier spacing may fit better when the RF impairment is higher (e.g., higher frequency offset, higher timing offset, higher IQ mismatch, and higher phase noise). The wider sub-carrier spacing may also fit better when the mobility is higher (e.g., when the Doppler frequency shift effect is higher). The wider sub-carrier spacing may further fit better when the service or application requires a lower latency, such as certain ultra-reliable low latency communications (URLLC).

A wider sub-carrier spacing may provide greater tolerance to errors or other changes and variations in the conditions and network parameters. Hence, a wider sub-carrier spacing may provide a more robust communication and may fit better when radio frequency (RF) impairment and mobility are high. A narrower sub-carrier spacing may save network resources when the conditions and services do not require a great tolerance or high robustness to the network errors and changes. By dynamically selecting a sub-carrier spacing based on the conditions and environment of the wireless communication and network, the efficiency and performance of the overall system and network may be improved.

In some embodiments, the selection of the sub-carrier spacing may be limited by the bandwidth of the frequency band. Certain sub-carrier spacing may not be available for a frequency bandwidth that is wider than a predetermined frequency bandwidth, or for a frequency bandwidth that is narrower than a predetermined frequency bandwidth, as shown in Tables 1-3. Tables 1 and 2 illustrate the transmission bandwidth, the number of resource blocks (NRB), and the sub-carrier spacing (SCS) for frequencies within 6 GHz (i.e., sub 6 GHz, labeled as "FR1"). Table 3 illustrates the transmission bandwidth, the number of resource blocks (Ni), and the sub-carrier spacing (SCS) for millimeter wave that is in the range of 30 GHz to 300 GHz (i.e., mmWave range, labeled as "FR2"). In Tables 1-3, "N.A." means the particular SCS is not available for the particular frequency bandwidth.

TABLE 1

Transmission Bandwidth Configuration $N_{RB}$ for FR1

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ |
|---|---|---|---|---|---|---|
| 15 | 25 | 52 | 79 | 106 | 133 | 160 |
| 30 | 11 | 24 | 38 | 51 | 65 | 78 |
| 60 | N.A. | 11 | 18 | 24 | 31 | 38 |

TABLE 2

Transmission Bandwidth Configuration $N_{RB}$ for FR1

| SCS (kHz) | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|
| 15 | 216 | 270 | N.A. | N.A. | N.A. | N.A. | N.A. |
| 30 | 106 | 133 | 162 | 189 | 217 | 245 | 273 |
| 60 | 51 | 65 | 79 | 93 | 107 | 121 | 135 |

TABLE 3

Transmission Bandwidth Configuration $N_{RB}$ for FR2

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A. |
| 120 | 32 | 66 | 132 | 264 |

For example, for sub 6 GHz frequency bands (FR1), when the frequency bandwidth is 60 MHz or more, 15 kHz SCS may not be available. When the frequency bandwidth is 5 MHz, 60 kHz SCS may not be available. For frequency bands within the mmWave range (FR2), when the frequency bandwidth is 400 MHz, 60 kHz SCS may not be available. Thus, the dynamical selection of the SCS may be based on a combination of one or more parameters indicating RF impairment, mobility, or service or application latency, and the transmission frequency bandwidth.

According to the present disclosure, the sub-carrier spacing may be dynamically selected based on the RF impairment. Radio frequency (RF) impairment refers to any radio frequency impediment or harm produced by an RF device (e.g., transmitter and/or receiver) in the network that causes distortions in the signals transmitted or received. RF impairment may be represented by various network parameters. Such parameters may include, for example, Doppler frequency shift effect, carrier frequency offset, timing offset, IQ mismatch, and phase noise.

In some embodiments, the sub-carrier spacing may be selected based on the carrier frequency offset measured in the network or a particular communication session. The carrier frequency offset may also be referred to as a local oscillator frequency offset. The carrier frequency offset may be caused by frequency differences between the transmitter and receiver oscillators. In some embodiments, the carrier frequency offset may also be caused by Doppler frequency shift of mobile channels and/or oscillator instabilities. The carrier frequency offset may include a frequency offset component caused by the difference between the transmitter and receiver oscillators and a frequency offset component caused by the Doppler frequency shift.

The carrier frequency offset may be classified into two categories: fractional frequency offset and integer frequency offset. The fractional frequency offset may introduce inter-sub-carrier-interference between sub-carriers. For an orthogonal frequency division multiplexing (OFDM) system, the fractional frequency offset may destroy the orthogonality of sub-carriers and result in degradation in the bit error rate (BER). Integer frequency offset may introduce a cyclic shift of sub-carriers. In integer frequency offset, phase change is proportional to OFDM symbol number. As a result of the integer frequency offset, the OFDM symbol may be incorrect after demodulation.

Carrier frequency offset may impact the signals after the signals are transformed with the Fast Fourier Transformation (hereinafter "FFT"). Carrier frequency offset may break the orthogonality between sub-carriers. Carrier frequency offset may also cause amplitude attenuation and phase shift for a sub-carrier. Inter-sub-carrier-interference for a sub-carrier k may be created by sub-carriers k−2, k−1, k+1, and k+2, where k is a sub-carrier index in a FFT plot of a signal received by a receiver.

Phase noise may be caused by the oscillator in the radio frequency front-end. For example, phase noise may be caused by phase fluctuations of an oscillator. Phase noise may result in inter-sub-carrier-interference between sub-carriers. Phase noise may rotate all sub-carriers by the same amount, which may be referred to as common phase error (hereinafter "CPE"). A small amount of CPE may cause a fuzzy constellation display. Phase noise may be defined by three factors, a frequency offset from the carrier frequency, a power spectral density in 1 Hz bandwidth, and a power reduction relative to carrier power in dBc/Hz. The unit dBc means decibels relative to the carrier, and is the ratio of a power of a signal to a power of the carrier signal. For example, a signal may have a phase noise of −40 dBc/Hz at a frequency offset of 100 kHz.

Timing offset may be defined as a delay in the received signal relative to an expected signal from the base station. Timing offset may occur due to delay spread in channels. Timing offset may introduce a constant phase shift from one sub-carrier to another. Amplitude and phase imbalance may occur when there is a timing offset between the in-phase (I) and quadrature (Q) signal paths. Timing offset may induce inter-symbol interference (ISI) and degrade system performance. Timing offset may be measured in second (s), millisecond (ms), or nanosecond (ns). Various methods may be used to estimate the timing offset. In some embodiments, the timing offset may be estimated from the frequency offset, such as the carrier frequency offset.

In-phase/quadrature (hereinafter "IQ") mismatch may be caused by the difference from the desired 90° phase shift and the amplitude imbalance between I (in-phase) and Q (quadrature) signals. I and Q signals are signals used in a modulation and/or demodulation, which are known in the art. In theory, the Q signal has the same amplitude as the I signal, and is shifted 90° in phase from the I signal. When the phase shift is not 90° or when the amplitudes are not the same, IQ mismatch may occur.

IQ mismatch may include IQ imbalance, IQ gain imbalance, and IQ phase imbalance. IQ imbalance may be produced by the RF front-end part of the receiver, for example, in a direct conversion receiver architecture, because there is no requirement for an analog image rejection filter. IQ gain imbalance may cause the I signal to be smaller than the Q signal, or vice versa. IQ gain imbalance may result in each sub-carrier being interfered with by its frequency mirror image sub-carrier. IQ phase imbalance may be caused when the phase shift between the I and Q signals is not exactly 90 degrees. IQ phase imbalance may cause all sub-carriers to be spread along the Q axis of a constellation. IQ mismatch may include at least one of an IQ imbalance, IQ gain imbalance, and IQ phase imbalance.

IQ mismatch may cause significant system degradations. For example, IQ mismatch may cause inter-sub-carrier interference in an OFDM transceiver. For example, some sub-carrier may interfere with other sub-carrier in the same frequency band. When the inter-sub-carrier interference is significant, system performance may be degraded.

IQ mismatch may be measured by various methods. In some embodiments, the level of IQ mismatch may be determined by measuring the IQ amplitude imbalance and the IQ phase imbalance. In some embodiments, the IQ mismatch may be determined by measuring the inter-sub-carrier interference (or inter channel interference) between sub-carriers.

The mobility of the network may also affect the selection of the sub-carrier spacing. When the network has a high mobility, the wireless devices are moving more frequently and/or faster relative to the base station. When the network has a low mobility, the wireless devices are moving less frequently and/or slower relative to the base station. Doppler frequency shift in carrier frequency occurs when a wireless device moves relative to the base station. The Doppler frequency shift in the carrier frequency is caused by the Doppler effect when a wireless device moves relative to the base station. A Doppler frequency may be calculated by $f\_d = v\_r * f * \cos(\alpha)/c$, where $f\_d$ is the Doppler frequency, $v\_r$ is the relative speed between the transmitter and the receiver, $\alpha$ is the angle of the relative velocity vector of the receiver (assuming the transmitter does not move), and c is the speed of light. The maximum Doppler frequency, $f\_d\_max$, occurs when $\alpha$ is 0, $f\_d\_max = v\_r * f/c$. An upper bound on the inter-carrier interference power $P_{ici}$ may be expressed as $P_{ici} \leq (2\pi * f\_d\_max * T\_s)^2/12$, where $T\_s$ is a symbol duration. If the symbol duration is chosen such that $f\_d\_max * T\_s$ is small, the inter-carrier-interference due to Doppler spread may be negligible. For example, a wider SCS (e.g., 30 kHz) may be chosen over a narrower SCS (e.g., 15 kHz) because the wider SCS is associated with a shorter symbol duration.

The Doppler frequency shift effect may be represented by a parameter $DF = f\_d\_max * T\_s$, i.e., the product of the maximum Doppler frequency and the symbol duration. Parameter DF may represent the level of mobility. The higher the Doppler frequency shift effect DF, the higher the mobility. The lower the Doppler frequency shift effect DF, the lower the mobility.

Service latency refers to a latency requirement of a service or application related to the data communication. For example, some services or applications may require a low latency, such as certain ultra-reliable low latency communication (URLLC). Examples of certain URLLC may include factory automation, which may have a latency requirement of 1 ms or less than. Examples of URLLC may also include motion control, which may have a latency requirement of 1 ms or less. Examples of URLLC may also include intelligent transportation systems, which may have a latency requirement of 5 ms or less. Examples of URLLC may also include smart grid, which may have a latency requirement of 3-5 ms. Examples of URLLC may also include tactile internet, which may have a latency requirement of 1 ms or less. Depending on the latency level, different SCS may be selected for difference services or applications.

In some embodiments, various services and/or applications may be categorized based on their latency requirements, and information about the latency requirement for these services and/or applications may be saved in a database or table. In some embodiments, a base station may determine whether a service or application is a low latency service or application based on the type of the service or application pre-stored in the database. For example, if a service or application related to motion control, a base station may determine that the service or application is a low latency service or application.

In some embodiments, a predetermined latency value may be set for determining whether a service or application is a low latency service or application. For example, the predetermined latency value may be 10 ms, and a latency of an application may be compared with the predetermined latency value to determine whether the application is a low latency application. For example, a wider SCS may be selected for a low latency service or application (e.g., latency level<=5 ms), and a narrower SCS may be selected for a high latency service or application (e.g., latency level>20 ms).

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may include an end-user wireless device that communicates with the access node directly without being relayed by a relay node.

An exemplary system described herein includes at least an access node (or base station), such as an eNodeB or a gigabit NodeB (gNodeB), and a plurality of end-user wireless devices. The system may also include a relay node in wireless communication with the access node and configured to relay data packets between the access node and an end-user wireless device served by the relay node.

Relay nodes may improve service quality by relaying communication between the access node and one or more end-user wireless devices in the wireless network that are indirectly connected with the access node through the relay nodes. For example, relay nodes may be used at the edge of a coverage area of an access node to improve and/or extend coverage and service, as well as in crowded areas having a high number of end-user wireless devices to increase the available throughput to the end-user wireless devices being relayed by the relay nodes. The access node may be referred to as a "donor" access node. Relay nodes are generally configured to communicate with the "donor" access node via a wireless backhaul connection, and to deploy a radio air interface to which end-user wireless devices can attach. Donor access nodes generally include scheduling modules or schedulers for scheduling or allocating resources to wireless devices directly connected thereto, as well as to the relay nodes connected to the donor access nodes through the wireless backhaul connection.

For illustrative purposes and simplicity, the disclosed technology for dynamically selecting a sub-carrier spacing will be illustrated and discussed as being implemented in the communications between an access node (e.g., a base station) and a wireless device (e.g., an end-user wireless device or a relay node). It is understood that the disclosed technology for dynamically selecting a sub-carrier spacing may also be applied to communications between an end-user wireless device and a relay node. For example, in some embodiments, based on one or more parameters indicating the conditions of the network (such as the RF impairment parameters, mobility, and service latency requirement), the relay node may select a sub-carrier spacing for the communications between the relay node and the end-user wireless device. The relay node may perform the sub-carrier spacing selecting or switching operations disclosed herein.

In addition to the systems and methods described herein, the operations for dynamically selecting a sub-carrier spacing may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system for wireless communication. System 100 may be a wireless communication network, such as a cellular network. System 100 may include a communication network 101, a gateway 102, a controller node 104, and an access node 110. Access node 110 may deploy a radio air interface serving one or more relay nodes 120 and 130, and one or more end-user wireless devices. One or more end-user wireless devices may be directly connected to access node 110, such as end-user wireless devices 140a, 140b, 140c, and 140d. One or more end-user wireless devices may be indirectly connected to access node 110 through relay nodes 120 and 130, such as end-user wireless devices 150 and 160. Hereinafter, for simplicity, the directly connected and indirectly connected end-user wireless devices are generally referred to as end-user wireless devices.

In the exemplary embodiment shown in FIG. 1, access node 110 may be a macro-cell access node configured to deploy a wireless radio air interface over a coverage area 111. Each of relay nodes 120, 130, and each of end-user wireless devices 140a, 140b, 140c, and 140d may be attached to the wireless air interface deployed by access node 110. Relay nodes 120 and 130 may be configured to communicate with access node 110 over wireless communication links 125 and 135, respectively (hereinafter, "wireless backhaul" or "backhaul"). Wireless links 125 and 135, as well as other wireless links that directly couple end-user wireless devices 140a, 140b, 140c, and 140d with access node 110, as shown in FIG. 1, form the wireless network (or wireless radio air interface) deployed by access node 110 within coverage area 111. Relay nodes 120 130 may be further configured to deploy additional wireless radio air interfaces over coverage areas 112 and 113, respectively. A plurality of end-user wireless devices 150 may be configured to attach to a wireless radio air interface or link 155 deployed by relay node 120, and a plurality of end-user wireless devices 160 may be configured to attach to a wireless air interface or link 165 deployed by relay node 130. All of the end-user wireless devices 150 and 160 are indirectly attached to the wireless radio air interface deployed by access node 110 through relay nodes 120 and 130.

In some embodiments, end-user wireless devices 150 and 160 may access network services using the combination of relay nodes 120 and 130, wireless backhaul links 125 and 135, and access node 110. In some embodiments, end-user wireless devices 140a, 140b, 140c, and 140d may access network services by directly connecting to access node 110. As shown in FIG. 1, end-user wireless devices 160 are illustrated as being located outside of coverage area 111 of access node 110. End-user wireless devices 160 may access network services provided by access node 110 through relay node 130. In this configuration, access node 110 may be referred to as a "donor" access node. In other embodiments, any other combination of donor access nodes, relay access nodes, and carriers deployed therefrom may be evident to those having ordinary skill in the art in light of this disclosure.

Access node 110 may be any network node configured to provide communication between end-user wireless devices 140a, 140b, 140c, 140d, 150, 160 and communication network 101, including standard access nodes such as a macro-cell access node, a base transceiver station, a radio base station, an eNodeB device, an enhanced eNodeB device, a gigabit NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 2 GHz to 100 GHz. In some embodiments, access node 110 may deploy a wireless network that supports multiple frequency bands selected from 2 GHz to 100 GHz. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120 and 130 may each include a processor and associated hardware circuitry configured to execute or direct the execution of computer-readable instructions to perform operations described herein. In some embodiments, access node 110 and relay nodes 120 and 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120 and 130 may receive instructions and other input at a user interface. Access node 110 may communicate with gateway 102 and controller node 104 via a communication link 106. Access node 110 and relay nodes 120 and 130 may communicate with each other, and other access nodes (not shown), using a wireless link or a wired link such as an X2 link. Components of access node 110 and relay nodes 120 and 130 are further described below.

End-user wireless devices 140a, 140b, 140c, 140d, 150, and 160 may be any device, system, combination of devices, or other such communication platform configured to wirelessly communicate with access node 110 and/or relay nodes 120 and 130 using one or more frequency bands deployed therefrom. End-user wireless devices 140a, 140b, 140c, and 140d may directly communicate with access node 110 without using a relay node, whereas end-user wireless devices 150 and 160 may indirectly communicate with access node using relay services provided by relay nodes 120 and 130. Each of end-user wireless devices 140a, 140b, 140c, 140d, 150, and 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by end-user wireless devices 150 and 160. Wireless network systems may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network systems implemented by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network systems.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, Ti, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR, and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120 and 130, resource requirements of end-user wireless devices 140a, 140b, 140c, 140d, 150, and 160, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
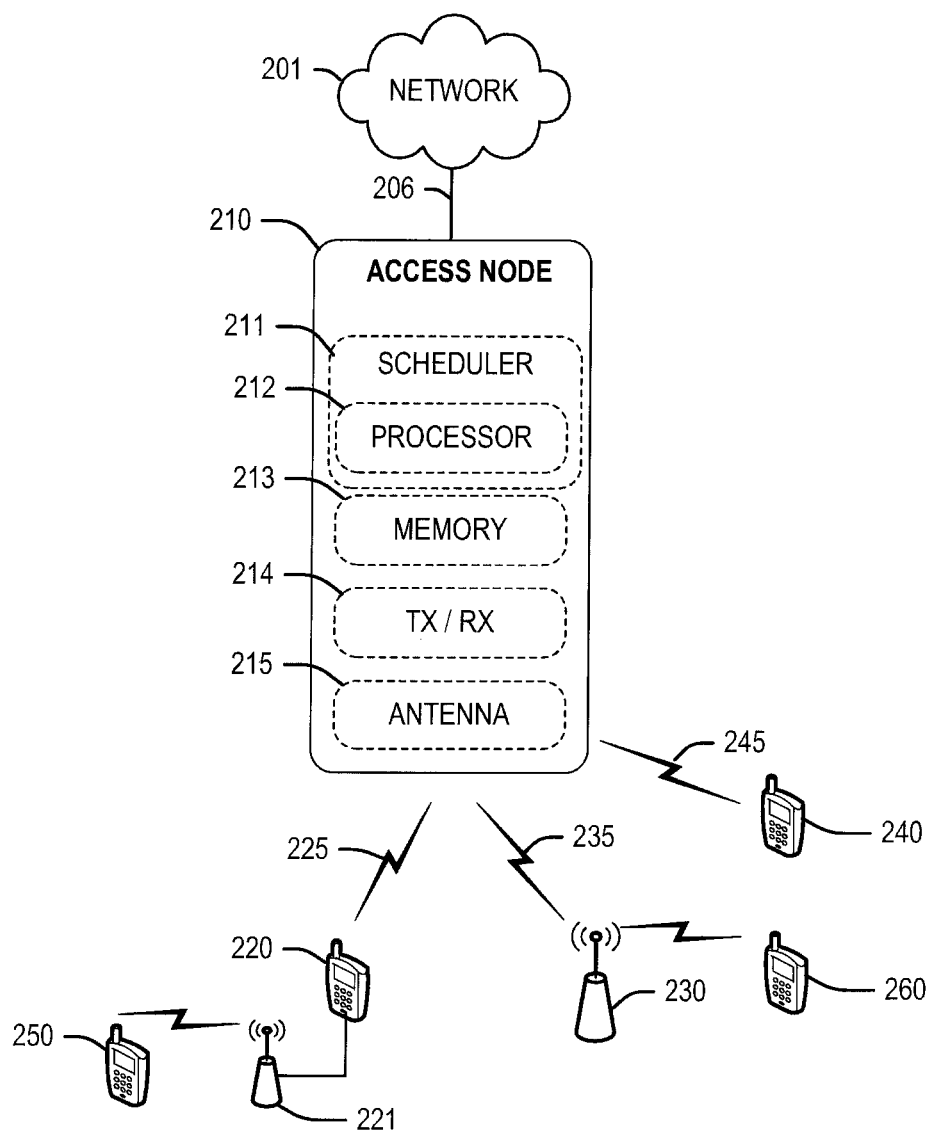
FIG. 2 depicts an exemplary access node, in accordance with the disclosed embodiments.

FIG. 2 depicts an exemplary access node 210. Access node 210 may include, for example, a macro-cell access node. Access node 210 may be an embodiment of access node 110 described with reference to FIG. 1. Access node 210 may include a scheduler 211, which may include a processor 212. Access node 210 may also include a memory 213, a transceiver 214, and an antenna 215. Scheduler 211 may be configured to schedule or allocate resources, including downlink and uplink resources, for relay nodes communicatively coupled to access node 210 and/or end-user wireless devices that are directly connected with access node 210. In some embodiments, processor 212 of scheduler 211 may be configured to execute instructions stored on memory 213 for performing various methods disclosed herein. Transceiver 214 and antenna 215 may be configured to enable wireless communication with a relay wireless device 220, a relay node 230, and an end-user wireless device 240.

Relay wireless device 220 may communicate with access node 210 through a wireless link 225. Relay node 230 may communicate with access node 210 through a wireless link 235. End-user wireless device 240 may communicate with access node 210 through a wireless link 240. Wireless links 225, 235, and 245 may form the wireless network (or wireless radio air interface) deployed by access node 210. Instructions stored on memory 213 may be accessed and executed by processor 212 to perform operations disclosed herein, such as deploying a wireless radio air interface (e.g., including wireless links 225, 235, and 245) via one or more of transceiver 214 and antenna 215. The operations performed by processor 212 may also include enabling relay wireless device 220, relay node 230, and end-user wireless devices 240 to access network services from a network 201 via access node 210.

Network 201 may be similar to network 101 discussed above. The operations performed by processor 212 may further include enabling relay wireless device 220 to communicate with end-user wireless device 250 and a relay access point 221, and enabling relay node 230 to communicate with end-user wireless device 260 and access node 210. Relay wireless device 220 and relay access point 221 may be referred to as a relay node as well. Although memory 213 is shown as separated from scheduler 211, in some embodiments, memory 213 may be included in scheduler 211. Alternatively, scheduler 211 may include an additional memory. In some embodiments, access node 210 may be referred to as a donor access node.

Figure 3:
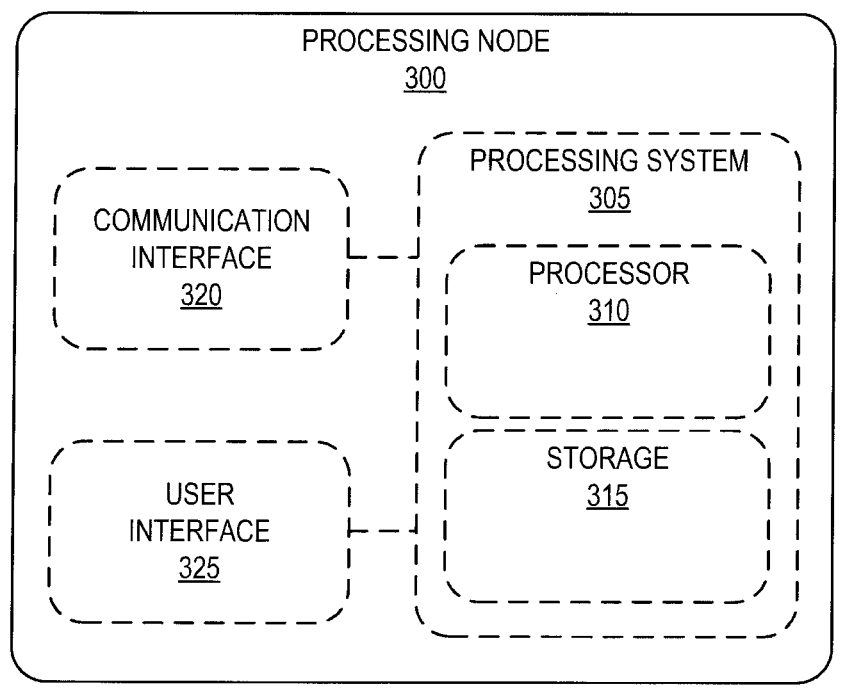
FIG. 3 depicts an exemplary processing node, in accordance with the disclosed embodiments.

FIG. 3 depicts an exemplary processing node 300, which may be configured to perform the methods and operations disclosed herein for dynamically selecting a sub-carrier spacing. In some embodiments, processing node 300 may be included in an access node, such as access node 110 or 210. In some embodiments, processing node 300 may be included in controller node 104, and may be configured for controlling the access nodes.

Processing node 300 may include a processing system 305. Processing system 305 may include a processor 310 and a storage device 315. Storage device 315 may include a disk drive, a flash drive, a memory, or other storage device configured to store data and/or computer readable instructions or codes (e.g., software). The computer executable instructions or codes maybe accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. Processor 310 may be a microprocessor and may include hardware circuitry and/or embedded codes configured to retrieve and execute software stored in storage device 315.

Processing node 300 may include a communication interface 320 and a user interface 325. Communication interface 320 may be configured to enable the processing system 305 to communicate with other components, nodes, or devices in the wireless network. Communication interface 320 may include hardware components, such as network communication ports, devices, routers, wires, antenna, transceivers, etc. User interface 325 may be configured to allow a user to provide input to processing node 300 and receive data or information from processing node 300. User interface 325 may include hardware components, such as touch screens, buttons, displays, speakers, etc. Processing node 300 may further include other components such as a power management unit, a control interface unit, etc.

Figure 4:
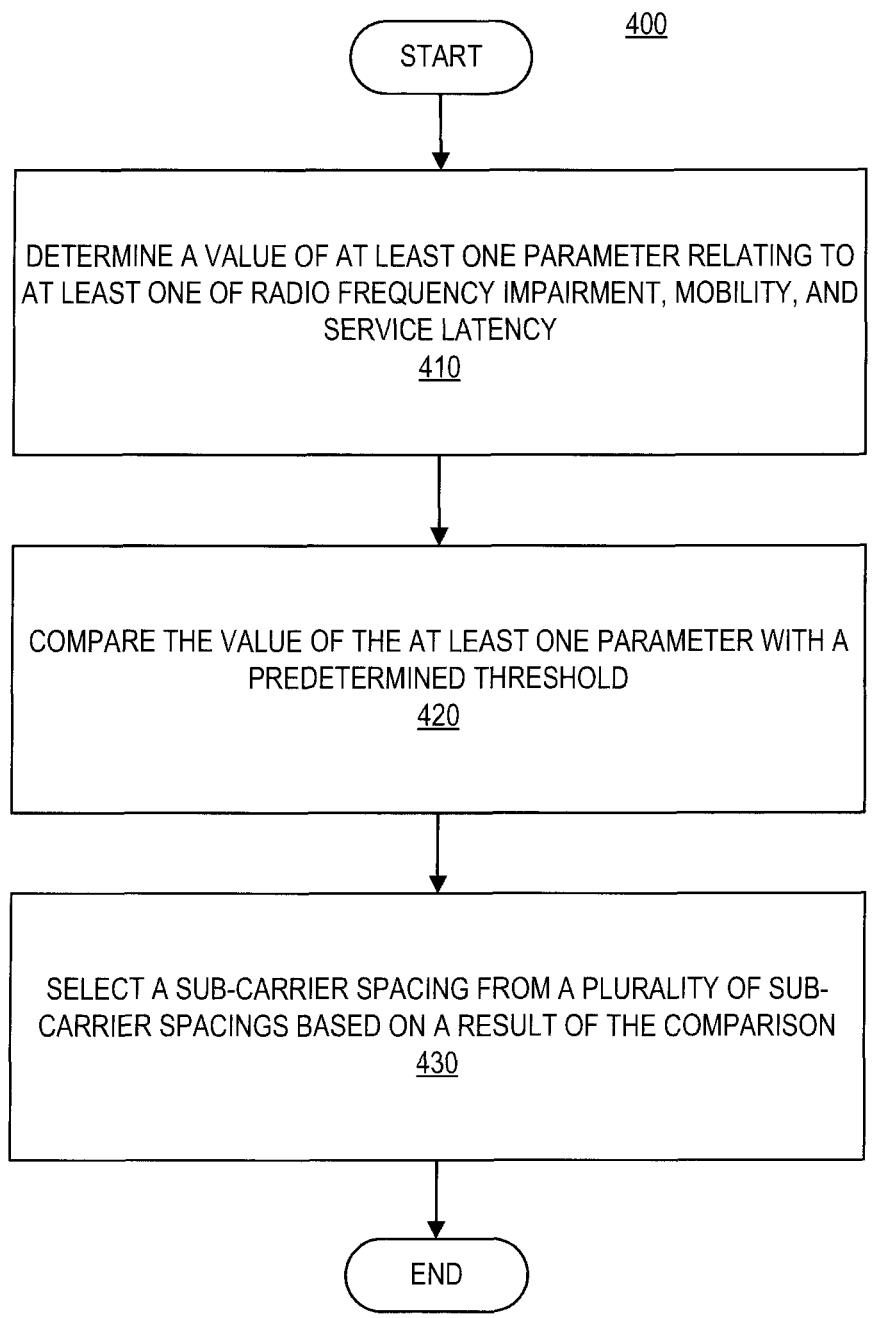
FIG. 4 depicts an exemplary method for dynamically selecting a sub-carrier spacing, in accordance with the disclosed embodiments.

The disclosed methods for dynamically selecting a sub-carrier spacing are discussed further below. FIG. 4 illustrates an exemplary method for dynamically selecting a sub-carrier spacing for a wireless network or a communication session. Method 400 may be performed by any suitable processor discussed herein, for example, a processor included in access node 110 or 210, processor 310 included in processing node 300, or a processor included in controller node 104.

For discussion purposes, as an example, method 400 is described as being performed by a processor included in access node 110.

Method 400 may include determining a value of at least one parameter relating to at least one of radio frequency (RF) impairment, mobility, and service latency (step 410). For example, access node 110 may determine a value of a parameter related to RF impairment, such as one or more of a carrier frequency offset, a timing offset, an IQ mismatch, and a phase noise. In some embodiments, access node 110 may determine a Doppler frequency shift effect that may indicate the level of mobility of the network. In some embodiments, access node 110 may determine a service latency, i.e., a latency level of a service or application. For example, access node 110 may determine a carrier frequency offset of 10 kHz, a timing offset of 50 ns, a phase noise of −105 dBc/Hz at 100 kHz, an IQ mismatch of (0.04, 3 degrees) in (IQ amplitude imbalance, IQ phase imbalance), or an IQ mismatch of −17 dB in inter-sub-carrier interference (or inter-channel interference) power level, and a latency level of 5 ms. It is understood that these numbers for the parameters are exemplary, and other suitable numbers may be measured or determined based on the conditions of the network system.

Method 400 may include comparing the value of the at least one parameter with a predetermined threshold (step 420). For example, access node 110 may compare a measured or determined parameter relating to the RF impairment to a predetermined threshold relating to the RF impairment. Access node 110 may compare a measured or determined parameter relating to mobility to a predetermined threshold relating to mobility. Access node 110 may compare a measured or determined parameter relating to service latency to a predetermined threshold relating to latency. For example, access node 110 may compare the above exemplary measured Doppler frequency shift effect, carrier frequency offset, timing offset, IQ mismatch, phase noise, and latency level with respective predetermined thresholds.

In some embodiments, the parameter relating to the RF impairment may include the carrier frequency offset. Access node 110 may determine the value of the carrier frequency offset or measure the carrier frequency offset based on the difference in the transmitter and receiver oscillators and/or based on the signals communicated in the network. Access node 110 may compare the measured carrier frequency offset with a predetermined carrier frequency offset threshold. For example, the measured carrier frequency offset may be 50 kHz, and the predetermined carrier frequency offset may be 30 kHz. In some embodiments, the measured carrier frequency offset may be compared to more than one threshold to determine which SCS to select. For example, the measured carrier frequency offset may be compared to an additional predetermined carrier frequency offset threshold.

In some embodiments, the parameter relating to the RF impairment may include a timing offset. Access node 110 may determine or measure the timing offset based on the signals transmitted in the network. Access node 110 may compare the measured timing offset to a predetermined timing offset threshold. For example, the measured timing offset may be 20 ns, and the predetermined timing offset threshold may be 16 ns. In some embodiments, the measured timing offset may be compared to more than one threshold to determine which SCS to select. For example, the measured timing offset may be compared to an additional predetermined timing offset threshold.

In some embodiments, the parameter relating to the RF impairment may include an IQ mismatch. Access node 110 may determine or measure the IQ mismatch using various methods. For example, the IQ mismatch may be determined by measuring the IQ amplitude imbalance and IQ phase imbalance, or the IQ mismatch may be determined by measuring the inter-sub-carrier interference (or inter-channel interference) power level. Access node 110 may use either the (IQ amplitude imbalance, IQ phase imbalance) or the inter-sub-carrier interference power level to quantify or represent the IQ mismatch. For example, the IQ mismatch may be measured as (IQ amplitude imbalance, IQ phase imbalance)=(0.05, 3 degrees). As another example, the IQ mismatch may be measured as −18 dB in the inter-sub-carrier interference power level.

The measured IQ mismatch may be compared with one or more predetermined IQ mismatch threshold. For example, when the IQ mismatch is measured as (IQ amplitude imbalance, IQ phase imbalance), the predetermined IQ mismatch threshold may be (predetermined IQ amplitude imbalance threshold, predetermined IQ phase imbalance threshold). The measured IQ mismatch may be compared with the predetermined IQ mismatch threshold to determine which SCS to select. In some embodiments, the measured (IQ amplitude imbalance, IQ phase imbalance) may be compared with one or more additional (predetermined IQ amplitude imbalance threshold, predetermined IQ phase imbalance threshold) to determine which SCS to select.

When the IQ mismatch is measured as the inter-sub-carrier interference power level, the predetermined IQ mismatch threshold may include a predetermined inter-sub-carrier interference power level. The measured inter-sub-carrier interference power level may be compared with the predetermined inter-sub-carrier interference power level threshold to determine which SCS to select. In some embodiments, the measured inter-sub-carrier interference power level may be compared with one or more additional predetermined inter-sub-carrier interference power level thresholds to determine which SCS to select.

In some embodiments, the parameter relating to the RF impairment may include a phase noise. For example, access node 110 may determine or measure the phase noise based on signals transmitted in the network. Access node 110 may compare the measured phase noise with a predetermined phase noise threshold. For example, the measured phase noise may be −105 dBc/Hz at 100 kHz, and the predetermined phase noise threshold may be −110 dBc/Hz at 100 kHz. In some embodiments, the measured phase noise may be compared to one or more additional predetermined phase noise thresholds to determine which SCS to select.

In some embodiments, the parameter relating to mobility may include a Doppler frequency shift effect. For example, access node 110 may determine or measure the Doppler frequency shift effect in the network based on signals transmitted in the network. In some embodiments, the Doppler frequency shift effect may be compared with one or more predetermined Doppler frequency shift effect thresholds to determine which SCS to select. For example, the parameter $DF=f\_d\_max*T\_s$, representing the measured Doppler frequency shift effect, may be compared with a predetermined Doppler frequency shift effect threshold to determine which SCS to select. In some embodiments, the measured DF may be 0.2, and the threshold may be 0.1. In some embodiment, the measured DF may be compared with one or more additional thresholds to determine which SCS to select.

In some embodiments, the parameter relating to service latency may include a latency level of a service or application relating to the communication. For example, access node 110 may determine, based on the type of the service or application relating to the data communication, which may be pre-stored in a database, that the latency level for a data communication is 18 ms. Access node 110 may compare the determined latency level with a predetermined latency threshold, which may be, for example, 20 ms. In some embodiments, the determined latency level may be compared with one or more additional predetermined latency thresholds to determine which SCS to select.

Referring to FIG. 4, method 400 may include selecting a sub-carrier spacing from a plurality of sub-carrier spacings based on a result of the comparison (step 430). The plurality of sub-carrier spacings may include, for example, 15 kHz, 30 kHz, 60 kHz, 120 kHz, 240 kHz, 480 kHz, etc. For example, access node 110 may compare the measured or determined carrier frequency offset, timing offset, IQ mismatch, phase noise, Doppler frequency shift effect (DF), and the latency level with respective predetermined thresholds.

In some embodiments, access node 110 may select a first sub-carrier spacing when the value of the at least one parameter is less than or equal to the first predetermined threshold. Access node 110 may select a second sub-carrier spacing when the value of the at least one parameter is greater than the first predetermined threshold and less than the second predetermined threshold. Access node 110 may select a third sub-carrier spacing when the value of the at least one parameter is greater than or equal to the second predetermined threshold. The first sub-carrier spacing may be narrower than the second sub-carrier spacing, and the second sub-carrier spacing may be narrower than the third sub-carrier spacing.

In some embodiments, access node 110 may select a first sub-carrier spacing when the value of the at least one parameter is greater than or equal to the first predetermined threshold. Access node 110 may select a second sub-carrier spacing when the value of the at least one parameter is less than the first predetermined threshold and greater than the second predetermined threshold. Access node 110 may select a third sub-carrier spacing when the value of the at least one parameter is less than or equal to the second predetermined threshold. The first sub-carrier spacing may be narrower than the second sub-carrier spacing, and the second sub-carrier spacing may be narrower than the third sub-carrier spacing.

In some embodiments, the first sub-carrier spacing is 15 kHz, the second sub-carrier spacing is 30 kHz, and the third sub-carrier spacing is 60 kHz or 120 kHz. Other sub-carrier spacings may also be used, such as 240 kHz, 480 kHz, etc. The first, second, and third sub-carrier spacings may be selected from any suitable value. For example, the first sub-carrier spacing may be 30 kHz, the second sub-carrier spacing may be 60 kHz, and the third sub-carrier spacing may be 120 kHz. As another example, the first sub-carrier spacing may be 60 kHz, the second sub-carrier spacing may be 120 kHz, and the third sub-carrier spacing may be 240 kHz. As a further example, the first sub-carrier spacing may be 120 kHz, the second sub-carrier spacing may be 240 kHz, and the third sub-carrier spacing may be 480 kHz.

In some embodiments, access node 110 may select a first sub-carrier spacing from the plurality of sub-carrier spacings when the Doppler frequency shift effect (DF) is less than or equal to a first predetermined Doppler frequency shift effect threshold. Access node 110 may select a second sub-carrier spacing from the plurality of sub-carrier spacings when the Doppler frequency shift effect is greater than the first predetermined Doppler frequency shift effect threshold, and less than a second predetermined Doppler frequency shift effect threshold. In some embodiments, access node 110 may select a third sub-carrier spacing from the plurality of sub-carrier spacings when the Doppler frequency shift effect is greater than or equal to the second predetermined Doppler frequency shift effect threshold. The first sub-carrier spacing may be narrower than the second sub-carrier spacing, and the second sub-carrier spacing may be narrower than the third sub-carrier spacing. In some embodiments, the first sub-carrier spacing is 15 kHz, the second sub-carrier spacing is 30 kHz, and the third sub-carrier spacing is 60 kHz or 120 kHz.

In some embodiments, access node 110 may select a first sub-carrier spacing from the plurality of sub-carrier spacings when the carrier frequency offset is less than or equal to a first predetermined carrier frequency offset threshold. Access node 110 may select a second sub-carrier spacing from the plurality of sub-carrier spacings when the carrier frequency offset is greater than the first predetermined carrier frequency offset threshold, and less than a second predetermined carrier frequency offset threshold. In some embodiments, access node 110 may select a third sub-carrier spacing from the plurality of sub-carrier spacings when the carrier frequency offset is greater than or equal to the second predetermined carrier frequency offset threshold. The first sub-carrier spacing may be narrower than the second sub-carrier spacing, and the second sub-carrier spacing may be narrower than the third sub-carrier spacing. In some embodiments, the first sub-carrier spacing is 15 kHz, the second sub-carrier spacing is 30 kHz, and the third sub-carrier spacing is 60 kHz or 120 kHz.

In some embodiments, access node 110 may select a first sub-carrier spacing from the plurality of sub-carrier spacings when the timing offset is less than or equal to a first predetermined timing offset threshold. Access node 110 may select a second sub-carrier spacing from the plurality of sub-carrier spacings when the timing offset is greater than the first predetermined timing offset threshold, and less than a second predetermined timing offset threshold. In some embodiments, access node 110 may select a third sub-carrier spacing from the plurality of sub-carrier spacings when the timing offset is greater than or equal to the second predetermined timing offset threshold. The first sub-carrier spacing may be narrower than the second sub-carrier spacing, and the second sub-carrier spacing may be narrower than the third sub-carrier spacing. In some embodiments, the first sub-carrier spacing is 15 kHz, the second sub-carrier spacing is 30 kHz, and the third sub-carrier spacing is 60 kHz or 120 kHz.

In some embodiments, access node 110 may select a first sub-carrier spacing from the plurality of sub-carrier spacings when the phase noise is less than or equal to a first predetermined phase noise threshold. Access node 110 may select a second sub-carrier spacing from the plurality of sub-carrier spacings when the phase noise is greater than the first predetermined phase noise threshold, and less than a second predetermined phase noise threshold. In some embodiments, access node 110 may select a third sub-carrier spacing from the plurality of sub-carrier spacings when the phase noise is greater than or equal to the second predetermined phase noise threshold. The first sub-carrier spacing may be narrower than the second sub-carrier spacing, and the second sub-carrier spacing may be narrower than the third sub-carrier spacing. In some embodiments, the first sub-carrier spacing is 15 kHz, the second sub-carrier spacing is 30 kHz, and the third sub-carrier spacing is 60 kHz or 120 kHz.

In some embodiments, access node 110 may select a first sub-carrier spacing from the plurality of sub-carrier spacings when the IQ mismatch is less than or equal to a first predetermined IQ mismatch threshold. Access node 110 may select a second sub-carrier spacing from the plurality of sub-carrier spacings when the IQ mismatch is greater than the first predetermined IQ mismatch threshold, and less than a second predetermined IQ mismatch threshold. In some embodiments, access node 110 may select a third sub-carrier spacing from the plurality of sub-carrier spacings when the IQ mismatch is greater than or equal to the second predetermined IQ mismatch threshold. The first sub-carrier spacing may be narrower than the second sub-carrier spacing, and the second sub-carrier spacing may be narrower than the third sub-carrier spacing. In some embodiments, the first sub-carrier spacing is 15 kHz, the second sub-carrier spacing is 30 kHz, and the third sub-carrier spacing is 60 kHz or 120 kHz.

In some embodiments, access node 110 may select a first sub-carrier spacing from the plurality of sub-carrier spacings when the latency level is greater than or equal to a first predetermined latency threshold. Access node 110 may select a second sub-carrier spacing from the plurality of sub-carrier spacings when the latency level is less than the first predetermined latency threshold, and greater than a second predetermined latency threshold. In some embodiments, access node 110 may select a third sub-carrier spacing from the plurality of sub-carrier spacings when the latency level is less than or equal to the second predetermined latency threshold. The first sub-carrier spacing may be narrower than the second sub-carrier spacing, and the second sub-carrier spacing may be narrower than the third sub-carrier spacing. In some embodiments, the first sub-carrier spacing is 15 kHz, the second sub-carrier spacing is 30 kHz, and the third sub-carrier spacing is 60 kHz or 120 kHz.

Figure 5:
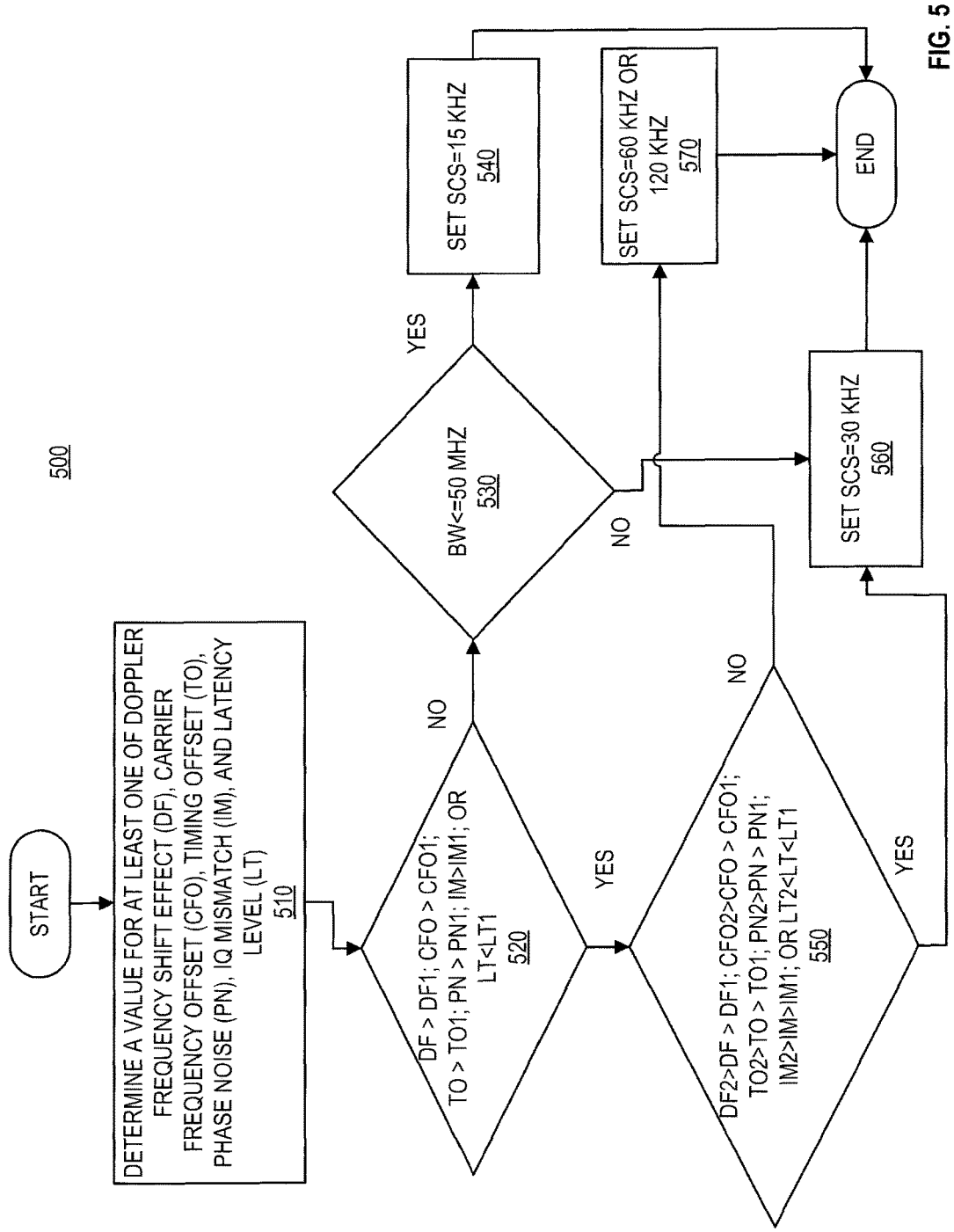
FIG. 5 depicts another exemplary method for dynamically selecting a sub-carrier spacing, in accordance with the disclosed embodiments.

FIG. 5 illustrates another exemplary method for dynamically selecting a sub-carrier spacing for a wireless network or a communication session. Method 500 may be an embodiment of method 400. Method 500 may be performed by any suitable processor discussed herein, for example, a processor included in access node 110 or 210, processor 310 included in processing node 300, or a processor included in controller node 104. For discussion purposes, as an example, method 500 is described as being performed by a processor included in access node 110.

Method 500 may include determining a value for at least one of Doppler frequency shift effect (DF), a carrier frequency offset (CFO), a timing offset (TO), a phase noise (PN), an IQ mismatch (IM), and a latency level (LT) (step 510). For example, access node 110 may determine or measure DF=0.2, CFO=±8 kHz, TO=20 ns, PN=−105 dBc/Hz at 100 kHz, and LT=10 ms. When IQ mismatch is determined by (IQ amplitude imbalance, IQ phase imbalance), access node 110 may determine the IQ mismatch to be, e.g., IM=(0.04, 3 degrees). When IQ mismatch is determined by measuring the inter-sub-carrier interference power level, the IQ mismatch may be determined as, e.g., IM=−18 dB. It is understood that in some embodiments, access node 110 may determine or measure all of the parameters in step 510. In some embodiments, access node 110 may determine any number of parameters selected from the parameters listed above in step 510.

The measured or determined parameters may be compared with their respective thresholds to determine whether any of a plurality of first conditions, relationships, or criteria is satisfied (step 520). For example, in step 520, DF may be compared with a first predetermined Doppler frequency shift effect threshold DF1 to determine if DF>DF1. CFO may be compared with a first predetermined carrier frequency offset threshold, CFO1, to determine if CFO>CFO1. TO may be compared with a first predetermined timing offset threshold TO1 to determine if TO>TO1. PN may be compared with a first predetermined phase noise threshold PN1 to determine if PN>PN1. IM may be compared with a first predetermined IQ mismatch threshold IM1 to determine if IM>IM1. LT may be compared with a first predetermined latency threshold LT1 to determine if LT<LT1. Examples of the first predetermined thresholds may be: DF1=0.1, CFO1=±7.5 kHz, TO1=16.276 ns, PN1=−110 dBc/Hz at 100 kHz, IM1= (0.03, 2 degrees) or IM1=−20 dB, and LT1=20 ms. These thresholds numbers are exemplary. Depending on the system and applications, other suitable numbers may also be used as the thresholds.

If any of conditions in step 520 is satisfied (i.e., DF>DF1, CFO>CFO1, TO>TO1, PN>PN1, IM>IM1, or LT<LT1) ("Yes"), access node 110 may perform step 550. Otherwise, if none of the conditions listed in step 520 is satisfied (i.e., DF<=DF1, CFO<=CFO1, TO<=TO1, PN<=PN1, IM<=IM1, and LT>=LT1) ("No," step 520), access node 110 may perform step 530. In step 530, access node may determine whether the frequency bandwidth associated with data transmission is less than or equal to a predetermined frequency bandwidth, e.g., 50 MHz. If the frequency bandwidth is less than or equal to 50 MHz ("Yes," step 530), access node 110 may select or set the sub-carrier spacing (SCS) as a first sub-carrier spacing, e.g., 15 kHz (step 540). If the frequency bandwidth is greater than 50 MHz ("No," step 530), access node 110 may select or set SCS=30 kHz (an example of a second sub-carrier spacing) (step 560). The frequency bandwidth 50 MHz is exemplary. Other suitable frequency bandwidth may also be used. In addition, the first sub-carrier spacing 15 kHz and the second sub-carrier spacing are exemplary. Other suitable spacings may also be used as the first sub-carrier spacing and the second sub-carrier spacing.

When any of the conditions listed in step 520 is satisfied, the related parameter or parameters may be also compared with an additional threshold or thresholds to determine which SCS to select, as shown in step 550. In step 550, the DF may be compared with a second predetermined Doppler frequency shift effect threshold DF2 to determine whether DF1<DF<DF2 is satisfied. If this relationship is satisfied, the output of the determination in step 550 is "Yes," and access node 110 may select SCS=30 kHz (an example of the second sub-carrier spacing) (step 560). In step 550, the CFO may be compared with a second carrier frequency offset threshold CFO2 to determine whether CFO1<CFO<CFO2 is satisfied. If this relationship is satisfied, the output of the determination in step 550 is "Yes," and access node 110 may select SCS=30 kHz (step 560). In step 550, the TO may be compared with a second predetermine timing offset threshold TO2 to determine whether TO1<TO<TO2 is satisfied. If this relationship is satisfied, the output of the determination in step 550 is "Yes," and access node 110 may select SCS=30 kHz (step 560). In step 550, the PN may be compared with a second predetermined phase noise threshold PN2 to determine whether PN1<PN<PN2 is satisfied. If this relationship is satisfied, the output of the determination in step 550 is "Yes," and access node 110 may select SCS=30 kHz (step 560). In step 550, the IM may be compared with a second predetermined IQ mismatch threshold IM2 to determine whether IM1<IM<IM2 is satisfied. If this relationship is satisfied, the output of the determination in step 550 is "Yes," and access node 110 may select SCS=30 kHz (step 560). In step 550, the LT may be compared with a second predetermined latency threshold LT2 to determine whether LT2<LT<LT1 is satisfied. If this relationship is satisfied, the output of the determination in step 550 is "Yes," and access node 110 may select SCS=30 kHz (step 560).

When none of the relationships or conditions in step 550 is satisfied (i.e., when DF>=DF2, CFO>=CFO2, TO>=TO2, PN>=PN2, IM>=IM2, and LT<=LT2), the determination in step 550 is "No," and access node 110 may select or set SCS=60 kHz or 120 kHz (examples of third sub-carrier spacing) (step 570). Other suitable spacings may also be used as the third sub-carrier spacing.

Examples of the second predetermined thresholds may include: DF2=0.3, CFO2=±15 kHz, TO2=32.552 ns, PN2=−100 dBc/Hz at 100 kHz, IM2=(0.06, 4 degrees) or IM2=−15 dB, and LT2=5 ms. These threshold numbers are exemplary. Depending on the conditions of the wireless network and communications, other suitable thresholds may also be used.

Figure 6:
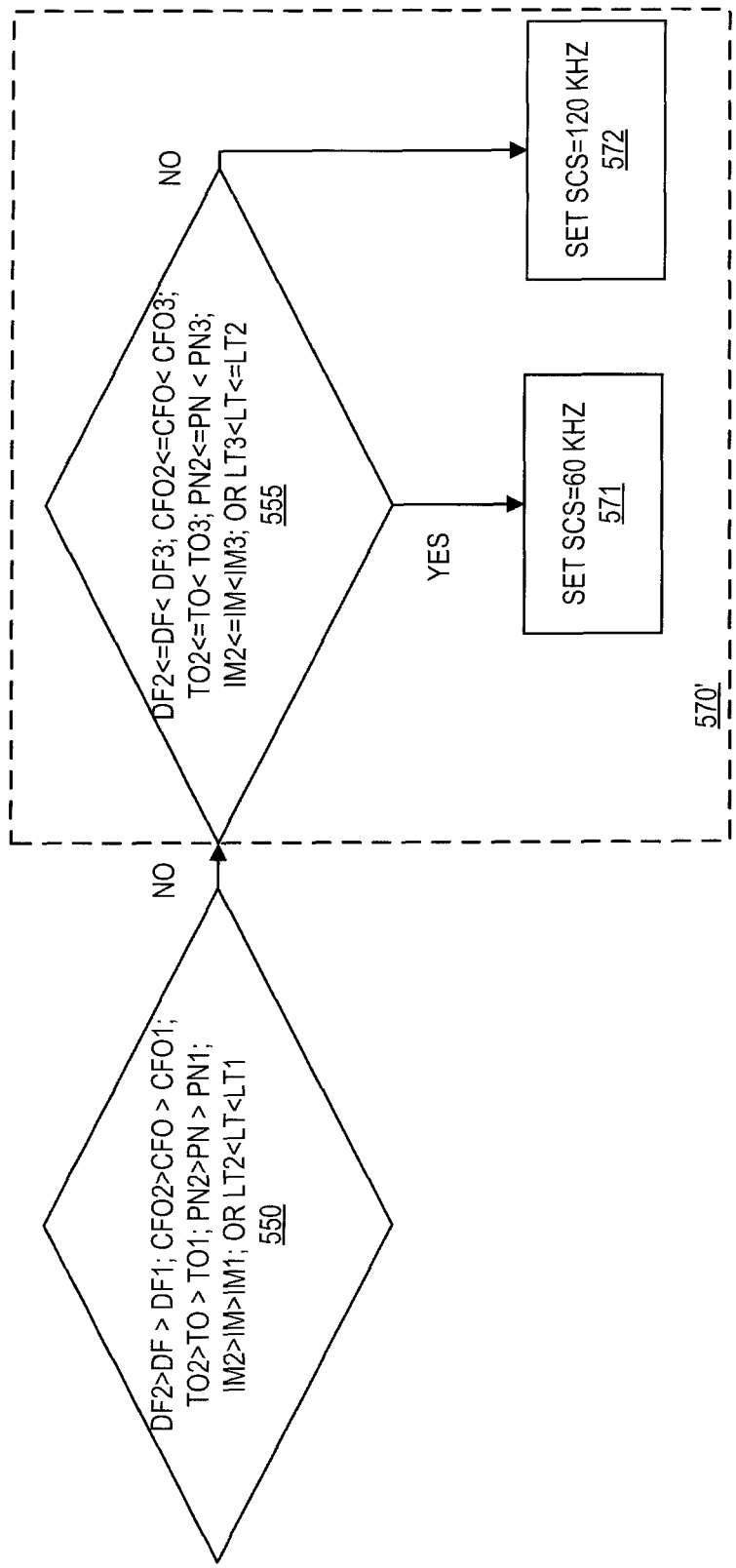
FIG. 6 depicts modified portions of the method shown in FIG. 5 for dynamically selecting a sub-carrier spacing, in accordance with the disclosed embodiments.

Method 500 may be modified to include additional operations. For example, FIG. 6 depicts portions of method 500 with modified step 570 (570'). As shown in FIG. 6, step 570 may be modified to include steps 555, 571, and 572 (collectively step 570'). After the "No" determination in step 550, an additional determination step 555 may be added to compare the parameters with respective third predetermined thresholds. For example, DF may be compared with a third predetermined Doppler frequency shift effect threshold DF3 to determine whether DF2<=DF<DF3. When this relationship is satisfied, access node 110 may select SCS=60 kHz (an example of a third sub-carrier spacing) (step 571). CFO may be compared with a third predetermined carrier frequency offset threshold CFO3 to determine whether CFO2<=CF<CFO3. When this relationship is satisfied, access node may select SCS=60 kHz (step 571). TO may be compared with a third predetermined timing offset threshold TO3 to determine whether TO2<=TO<TO3. When this relationship is satisfied, access node 110 may select SCS=60 kHz (step 571). PN may be compared with a third predetermined phase noise threshold PN3 to determine whether PN2<=PN<PN3. When this relationship is satisfied, access node 110 may select SCS=60 kHz (step 571). IM may be compared with a third predetermined IQ mismatch threshold IM3 to determine whether IM2<=IM<IM3. When this relationship is satisfied, access node 110 may select SCS=60 kHz (step 571). LT may be compared with a third predetermined latency threshold LT3 to determine whether LT3<LT<=LT2. When this relationship is satisfied, access node 110 may select SCS=60 kHz (step 571). It is understood that 60 kHz is an exemplary for the third sub-carrier spacing. Other suitable spacings may also be used as the third sub-carrier spacing.

When none of the relationships or conditions is satisfied in step 555 (i.e., when DF>=DF3, CFO>=CFO3, TO>=TO3, PN>=PN3, IM>=IM3, and LT<=LT3) ("No," step 555), access node 110 may select SCS=120 kHz (an example of a fourth sub-carrier spacing) (step 572). It is understood that 120 kHz is exemplary. Other suitable spacings may also be used as the fourth sub-carrier spacing. Examples of the respective third thresholds may include: DF3=0.4, CFO3=±30 kHz, TO3=64 ns, PN3=−90 dBc/Hz at 100 kHz, IM3=(0.10, 6 degrees) or IM3=−10 dB, and LT3=2 ms. These threshold numbers are exemplary. Depending on the conditions of the systems and the communications, other suitable thresholds may also be used.

Method 500 may also be modified to have different criteria for selecting SCS, as shown in FIG. 7. FIG. 7 shows modified steps 520 (520') and modified step 550 (550'). Step 520 may be modified to be step 520'. Instead of determining whether any of the listed conditions (DF>DF1, CFO>CFO1, TO>TO1, PN>PN1, IM>IM1, LT<LT1), access node 110 may determine whether two or more parameters satisfy the listed conditions. For example, in one embodiment, access node 110 may determine whether two of the listed conditions are satisfied, or three of the listed conditions are satisfied, or four of the listed conditions are satisfied, or five of the listed conditions are satisfied, or all six of the listed conditions are satisfied. The number of parameters selected for determining selection of SCS may be any number from 1 to 6 (the case of one parameter is shown in step 520 in FIG. 5). In some embodiments, access node 110 may determine whether a certain percentage of the parameters satisfy the listed conditions in step 520', such as 80%, 90%, etc. If the determination of step 520' is No, access node 110 may perform step 530 shown in FIG. 5.

If the determination of step 520' is Yes, access node 110 may perform step 550'. Step 550' is modified from step 550 shown in FIG. 5. In step 550', access node 110 may determine whether two or more parameters satisfy the listed conditions. In some embodiments, the two or more parameters selected in step 550' are the same as the two or more parameters selected in step 520'. Thus, when two, three, four, five, or six parameters are selected in step 520', the same two, three, four, five, or six parameters may be selected in step 550' to determine selection of SCS. When the determination in step 550' is No, access node 110 may perform step 570 shown in FIG. 5. When the determination in step 550' is Yes, access node 110 may perform step 560 shown in FIG. 5.

For example, in some embodiments, in step 520', access node 110 may determine whether DF>DF1 and CFO>CFO1 are satisfied. If DF>DF1 and CFO>CFO1 are not both satisfied, the determination of step 520' is No, and access node 110 may perform step 530. If both DF>DF1 and CFO>CFO1 are satisfied, the determination of step 520' is Yes, and access node 110 may perform step 550'. In step 550', access node 110 may determine whether DF2>DF>DF1 and CFO2>CFO>CFO1 are both satisfied. If DF2>DF>DF1 and CFO2>CFO>CFO1 are not both satisfied, the determination of step 550' is No, and access node 110 may perform step 570. If DF2>DF>DF1 and CFO2>CFO>CFO1 are both satisfied, the determination of step 550' is Yes, and access node 110 may perform step 560.

In some embodiments, in step 520', access node 110 may determine whether DF>DF1 and TO>TO1 are both satisfied. If DF>DF1 and TO>TO1 are not both satisfied ("No," step 520'), access node 110 may perform step 530. If DF>DF1 and TO>TO1 are both satisfied ("Yes," step 520'), access node 110 may perform step 550'. In step 550', access node 110 may determine whether DF2>DF>DF1 and TO2>TO>TO1 are both satisfied. If DF2>DF>DF1 and TO2>TO>TO1 are not both satisfied ("No," step 550'), access node 110 may perform step 570. If DF2>DF>DF1 and TO2>TO>TO1 are both satisfied ("Yes," step 550'), access node 110 may perform step 560.

In some embodiments, in step 520', access node 110 may determine whether DF>DF1 and PN>PN1 are both satisfied. If DF>DF1 and PN>PN1 are not both satisfied ("No," step 520'), access node 110 may perform step 530. If DF>DF1 and PN>PN1 are both satisfied ("Yes," step 520'), access node 110 may perform step 550'. In step 550', access node 110 may determine whether DF2>DF>DF1 and PN2>PN>PN1 are both satisfied. If DF2>DF>DF1 and PN2>PN>PN1 are not both satisfied ("No," step 550'), access node 110 may perform step 570. If DF2>DF>DF1 and PN2>PN>PN1 are both satisfied ("Yes," step 550'), access node 110 may perform step 560.

In some embodiments, in step 520', access node 110 may determine whether DF>DF1 and IM>IM1 are both satisfied. If DF>DF1 and IM>IM1 are not both satisfied ("No," step 520'), access node 110 may perform step 530. If DF>DF1 and IM>IM1 are both satisfied ("Yes," step 520'), access node 110 may perform step 550'. In step 550', access node 110 may determine whether DF2>DF>DF1 and IM2>IM>IM1 are both satisfied. If DF2>DF>DF1 and IM2>IM>IM1 are not both satisfied ("No," step 550'), access node 110 may perform step 570. If DF2>DF>DF1 and IM2>IM>IM1 are both satisfied ("Yes," step 550'), access node 110 may perform step 560.

In some embodiments, in step 520', access node 110 may determine whether DF>DF1 and LT<LT1 are both satisfied. If DF>DF1 and LT<LT1 are not both satisfied ("No," step 520'), access node 110 may perform step 530. If DF>DF1 and LT<LT1 are both satisfied ("Yes," step 520'), access node 110 may perform step 550'. In step 550', access node 110 may determine whether DF2>DF>DF1 and LT2<LT<LT1 are both satisfied. If DF2>DF>DF1 and LT2<LT<LT1 are not both satisfied ("No," step 550'), access node 110 may perform step 570. If DF2>DF>DF1 and LT2<LT<LT1 are both satisfied ("Yes," step 550'), access node 110 may perform step 560.

In some embodiments, in step 520', access node 110 may determine whether CFO>CFO1 and TO>TO1 are both satisfied. If CFO>CFO1 and TO>TO1 are not both satisfied ("No," step 520'), access node 110 may perform step 530. If CFO>CFO1 and TO>TO1 are both satisfied ("Yes," step 520'), access node 110 may perform step 550'. In step 550', access node 110 may determine whether CFO2>CFO>CFO1 and TO2>TO>TO1 are both satisfied. If CFO2>CFO>CFO1 and TO2>TO>TO1 are not both satisfied ("No," step 550'), access node 110 may perform step 570. If CFO2>CFO>CFO1 and TO2>TO>TO1 are both satisfied ("Yes," step 550'), access node 110 may perform step 560.

In some embodiments, in step 520', access node 110 may determine whether CFO>CFO1 and PN>PN1 are both satisfied. If CFO>CFO1 and PN>PN1 are not both satisfied ("No," step 520'), access node 110 may perform step 530. If CFO>CFO1 and PN>PN1 are both satisfied ("Yes," step 520'), access node 110 may perform step 550'. In step 550', access node 110 may determine whether CFO2>CFO>CFO1 and PN2>PN>PN1 are both satisfied. If CFO2>CFO>CFO1 and PN2>PN>PN1 are not both satisfied ("No," step 550'), access node 110 may perform step 570. If CFO2>CFO>CFO1 and PN2>PN>PN1 are both satisfied ("Yes," step 550'), access node 110 may perform step 560.

In some embodiments, in step 520', access node 110 may determine whether CFO>CFO1 and IM>IM1 are both satisfied. If CFO>CFO1 and IM>IM1 are not both satisfied ("No," step 520'), access node 110 may perform step 530. If CFO>CFO1 and IM>IM1 are both satisfied ("Yes," step 520'), access node 110 may perform step 550'. In step 550', access node 110 may determine whether CFO2>CFO>CFO1 and IM2>IM>IM1 are both satisfied. If CFO2>CFO>CFO1 and IM2>IM>IM1 are not both satisfied ("No," step 550'), access node 110 may perform step 570. If CFO2>CFO>CFO1 and IM2>IM>IM1 are both satisfied ("Yes," step 550'), access node 110 may perform step 560.

In some embodiments, in step 520', access node 110 may determine whether CFO>CFO1 and LT<LT1 are both satisfied. If CFO>CFO1 and LT<LT1 are not both satisfied ("No," step 520'), access node 110 may perform step 530. If CFO>CFO1 and LT<LT1 are both satisfied ("Yes," step 520'), access node 110 may perform step 550'. In step 550', access node 110 may determine whether CFO2>CFO>CFO1 and LT2<LT<LT1 are both satisfied. If CFO2>CFO>CFO1 and LT2<LT<LT1 are not both satisfied ("No," step 550'), access node 110 may perform step 570. If CFO2>CFO>CFO1 and LT2<LT<LT1 are both satisfied ("Yes," step 550'), access node 110 may perform step 560.

In some embodiments, in step 520', access node 110 may determine whether TO>TO1 and PN>PN1 are both satisfied. If TO>TO1 and PN>PN1 are not both satisfied ("No," step 520'), access node 110 may perform step 530. If TO>TO1 and PN>PN1 are both satisfied ("Yes," step 520'), access node 110 may perform step 550'. In step 550', access node 110 may determine whether TO2>TO>TO1 and PN2>PN>PN1 are both satisfied. If TO2>TO>TO1 and PN2>PN>PN1 are not both satisfied ("No," step 550'), access node 110 may perform step 570. If TO2>TO>TO1 and PN2>PN>PN1 are both satisfied ("Yes," step 550'), access node 110 may perform step 560.

In some embodiments, in step 520', access node 110 may determine whether TO>TO1 and IM>IM1 are both satisfied. If TO>TO1 and IM>IM1 are not both satisfied ("No," step 520'), access node 110 may perform step 530. If TO>TO1 and IM>IM1 are both satisfied ("Yes," step 520'), access node 110 may perform step 550'. In step 550', access node 110 may determine whether TO2>TO>TO1 and IM2>IM>IM1 are both satisfied. If TO2>TO>TO1 and IM2>IM>IM1 are not both satisfied ("No," step 550'), access node 110 may perform step 570. If TO2>TO>TO1 and IM2>IM>IM1 are both satisfied ("Yes," step 550'), access node 110 may perform step 560.

In some embodiments, in step 520', access node 110 may determine whether TO>TO1 and LT<LT1 are both satisfied. If TO>TO1 and LT<LT1 are not both satisfied ("No," step 520'), access node 110 may perform step 530. If TO>TO1 and LT<LT1 are both satisfied ("Yes," step 520'), access node 110 may perform step 550'. In step 550', access node 110 may determine whether TO2>TO>TO1 and LT2<LT<LT1 are both satisfied. If TO2>TO>TO1 and LT2<LT<LT1 are not both satisfied ("No," step 550'), access node 110 may perform step 570. If TO2>TO>TO1 and LT2<LT<LT1 are both satisfied ("Yes," step 550'), access node 110 may perform step 560.

In some embodiments, in step 520', access node 110 may determine whether PN>PN1 and IM>IM1 are both satisfied. If PN>PN1 and IM>IM1 are not both satisfied ("No," step 520'), access node 110 may perform step 530. If PN>PN1 and IM>IM1 are both satisfied ("Yes," step 520'), access node 110 may perform step 550'. In step 550', access node 110 may determine whether PN2>PN>PN1 and IM2>IM>IM1 are both satisfied. If PN2>PN>PN1 and IM2>IM>IM1 are not both satisfied ("No," step 550'), access node 110 may perform step 570. If PN2>PN>PN1 and IM2>IM>IM1 are both satisfied ("Yes," step 550'), access node 110 may perform step 560.

In some embodiments, in step 520', access node 110 may determine whether PN>PN1 and LT<LT1 are both satisfied. If PN>PN1 and LT<LT1 are not both satisfied ("No," step 520'), access node 110 may perform step 530. If PN>PN1 and LT<LT1 are both satisfied ("Yes," step 520'), access node 110 may perform step 550'. In step 550', access node 110 may determine whether PN2>PN>PN1 and LT2<LT<LT1 are both satisfied. If PN2>PN>PN1 and LT2<LT<LT1 are not both satisfied ("No," step 550'), access node 110 may perform step 570. If PN2>PN>PN1 and LT2<LT<LT1 are both satisfied ("Yes," step 550'), access node 110 may perform step 560.

In some embodiments, in step 520', access node 110 may determine whether IM>IM1 and LT<LT1 are both satisfied. If IM>IM1 and LT<LT1 are not both satisfied ("No," step 520'), access node 110 may perform step 530. If IM>IM1 and LT<LT1 are both satisfied ("Yes," step 520'), access node 110 may perform step 550'. In step 550', access node 110 may determine whether IM2>IM>IM1 and LT2<LT<LT1 are both satisfied. If IM2>IM>IM1 and LT2<LT<LT1 are not both satisfied ("No," step 550'), access node 110 may perform step 570. If IM2>IM>IM1 and LT2<LT<LT1 are both satisfied ("Yes," step 550'), access node 110 may perform step 560.

In some embodiments, in step 520', access node 110 may determine whether DF>DF1, CFO>CFO1, and TO>TO1 are all satisfied. If DF>DF1, CFO>CFO1, and TO>TO1 are not all satisfied ("No," step 520'), access node 110 may perform step 530. If DF>DF1, CFO>CFO1, and TO>TO1 are all satisfied ("Yes," step 520'), access node 110 may perform step 550'. In step 550', access node 110 may determine whether DF2>DF>DF1, CFO2>CFO>CFO1, and TO2>TO>TO1 are all satisfied. If DF2>DF>DF1, CFO2>CFO>CFO1, and TO2>TO>TO1 are not all satisfied ("No," step 550'), access node 110 may perform step 570. If DF2>DF>DF1, CFO2>CFO>CFO1, and TO2>TO>TO1 are all satisfied ("Yes," step 550'), access node 110 may perform step 560.

In some embodiments, in step 520', access node 110 may determine whether DF>DF1, CFO>CFO1, and PN>PN1 are all satisfied. If DF>DF1, CFO>CFO1, and PN>PN1 are not all satisfied ("No," step 520'), access node 110 may perform step 530. If DF>DF1, CFO>CFO1, and PN>PN1 are all satisfied ("Yes," step 520'), access node 110 may perform step 550'. In step 550', access node 110 may determine whether DF2>DF>DF1, CFO2>CFO>CFO1, and PN2>PN>PN1 are all satisfied. If DF2>DF>DF1, CFO2>CFO>CFO1, and PN2>PN>PN1 are not all satisfied ("No," step 550'), access node 110 may perform step 570. If DF2>DF>DF1, CFO2>CFO>CFO1, and PN2>PN>PN1 are all satisfied ("Yes," step 550'), access node 110 may perform step 560.

In some embodiments, in step 520', access node 110 may determine whether DF>DF1, CFO>CFO1, and IM>IM1 are all satisfied. If DF>DF1, CFO>CFO1, and IM>IM1 are not all satisfied ("No," step 520'), access node 110 may perform step 530. If DF>DF1, CFO>CFO1, and IM>IM1 are all satisfied ("Yes," step 520'), access node 110 may perform step 550'. In step 550', access node 110 may determine whether DF2>DF>DF1, CFO2>CFO>CFO1, and IM2>IM>IM1 are all satisfied. If DF2>DF>DF1, CFO2>CFO>CFO1, and IM2>IM>IM1 are not all satisfied ("No," step 550'), access node 110 may perform step 570. If DF2>DF>DF1, CFO2>CFO>CFO1, and IM2>IM>IM1 are all satisfied ("Yes," step 550'), access node 110 may perform step 560.

In some embodiments, in step 520', access node 110 may determine whether DF>DF1, CFO>CFO1, and LT<LT1 are all satisfied. If DF>DF1, CFO>CFO1, and LT<LT1 are not all satisfied ("No," step 520'), access node 110 may perform step 530. If DF>DF1, CFO>CFO1, and LT<LT1 are all satisfied ("Yes," step 520'), access node 110 may perform step 550'. In step 550', access node 110 may determine whether DF2>DF>DF1, CFO2>CFO>CFO1, and LT2<LT<LT1 are all satisfied. If DF2>DF>DF1, CFO2>CFO>CFO1, and LT2<LT<LT1 are not all satisfied ("No," step 550'), access node 110 may perform step 570. If DF2>DF>DF1, CFO2>CFO>CFO1, and LT2<LT<LT1 are all satisfied ("Yes," step 550'), access node 110 may perform step 560.

In some embodiments, in step 520', access node 110 may determine whether CFO>CFO1, TO>TO1, and PN>PN1 are all satisfied. If CFO>CFO1, TO>TO1, and PN>PN1 are not all satisfied ("No," step 520'), access node 110 may perform step 530. If CFO>CFO1, TO>TO1, and PN>PN1 are all satisfied ("Yes," step 520'), access node 110 may perform step 550'. In step 550', access node 110 may determine whether CFO2>CFO>CFO1, TO2>TO>TO1, and PN2>PN>PN1 are all satisfied. If CFO2>CFO>CFO1, TO2>TO>TO1, and PN2>PN>PN1 are not all satisfied ("No," step 550'), access node 110 may perform step 570. If CFO2>CFO>CFO1, TO2>TO>TO1, and PN2>PN>PN1 are all satisfied ("Yes," step 550'), access node 110 may perform step 560.

In some embodiments, in step 520', access node 110 may determine whether CFO>CFO1, TO>TO1, and IM>IM1 are all satisfied. If CFO>CFO1, TO>TO1, and IM>IM1 are not all satisfied ("No," step 520'), access node 110 may perform step 530. If CFO>CFO1, TO>TO1, and IM>IM1 are all satisfied ("Yes," step 520'), access node 110 may perform step 550'. In step 550', access node 110 may determine whether CFO2>CFO>CFO1, TO2>TO>TO1, and IM2>IM>IM1 are all satisfied. If CFO2>CFO>CFO1, TO2>TO>TO1, and IM2>IM>IM1 are not all satisfied ("No," step 550'), access node 110 may perform step 570. If CFO2>CFO>CFO1, TO2>TO>TO1, and IM2>IM>IM1 are all satisfied ("Yes," step 550'), access node 110 may perform step 560.

In some embodiments, in step 520', access node 110 may determine whether CFO>CFO1, TO>TO1, and LT<LT1 are all satisfied. If CFO>CFO1, TO>TO1, and LT<LT1 are not all satisfied ("No," step 520'), access node 110 may perform step 530. If CFO>CFO1, TO>TO1, and LT<LT1 are all satisfied ("Yes," step 520'), access node 110 may perform step 550'. In step 550', access node 110 may determine whether CFO2>CFO>CFO1, TO2>TO>TO1, and LT2<LT<LT1 are all satisfied. If CFO2>CFO>CFO1, TO2>TO>TO1, and LT2<LT<LT1 are not all satisfied ("No," step 550'), access node 110 may perform step 570. If CFO2>CFO>CFO1, TO2>TO>TO1, and LT2<LT<LT1 are all satisfied ("Yes," step 550'), access node 110 may perform step 560.

In some embodiments, in step 520', access node 110 may determine whether TO>TO1, PN>PN1, and IM>IM1 are all satisfied. If TO>TO1, PN>PN1, and IM>IM1 are not all satisfied ("No," step 520'), access node 110 may perform step 530. If TO>TO1, PN>PN1, and IM>IM1 are all satisfied ("Yes," step 520'), access node 110 may perform step 550'. In step 550', access node 110 may determine whether TO2>TO>TO1, PN2>PN>PN1, and IM2>IM>IM1 are all satisfied. If TO2>TO>TO1, PN2>PN>PN1, and IM2>IM>IM1 are not all satisfied ("No," step 550'), access node 110 may perform step 570. If TO2>TO>TO1, PN2>PN>PN1, and IM2>IM>IM1 are all satisfied ("Yes," step 550'), access node 110 may perform step 560.

In some embodiments, in step 520', access node 110 may determine whether TO>TO1, PN>PN1, and LT<LT1 are all satisfied. If TO>TO1, PN>PN1, and LT<LT1 are not all satisfied ("No," step 520'), access node 110 may perform step 530. If TO>TO1, PN>PN1, and LT<LT1 are all satisfied ("Yes," step 520'), access node 110 may perform step 550'.

In step 550', access node 110 may determine whether TO2>TO>TO1, PN2>PN>PN1, and LT2<LT<LT1 are all satisfied. If TO2>TO>TO1, PN2>PN>PN1, and LT2<LT<LT1 are not all satisfied ("No," step 550'), access node 110 may perform step 570. If TO2>TO>TO1, PN2>PN>PN1, and LT2<LT<LT1 are all satisfied ("Yes," step 550'), access node 110 may perform step 560.

In some embodiments, in step 520', access node 110 may determine whether PN>PN1, IM>IM1, and LT<LT1 are all satisfied. If PN>PN1, IM>IM1, and LT<LT1 are not all satisfied ("No," step 520'), access node 110 may perform step 530. If PN>PN1, IM>IM1, and LT<LT1 are all satisfied ("Yes," step 520'), access node 110 may perform step 550'. In step 550', access node 110 may determine whether PN2>PN>PN1, IM2>IM>IM1, and LT2<LT<LT1 are all satisfied. If TO2>TO>TO1, PN2>PN>PN1, IM2>IM>IM1, and LT2<LT<LT1 are not all satisfied ("No," step 550'), access node 110 may perform step 570. If PN2>PN>PN1, IM2>IM>IM1, and LT2<LT<LT1 are all satisfied ("Yes," step 550'), access node 110 may perform step 560.

In some embodiments, in step 520', access node 110 may determine whether DF>DF1, CFO>CFO1, TO>TO1, and PN>PN1 are all satisfied. If DF>DF1, CFO>CFO1, TO>TO1, and PN>PN1 are not all satisfied ("No," step 520'), access node 110 may perform step 530. If DF>DF1, CFO>CFO1, TO>TO1, and PN>PN1 are all satisfied ("Yes," step 520'), access node 110 may perform step 550'. In step 550', access node 110 may determine whether DF2>DF>DF1, CFO2>CFO>CFO1, TO2>TO>TO1, and PN2>PN>PN1 are all satisfied. If DF2>DF>DF1, CFO2>CFO>CFO1, TO2>TO>TO1, and PN2>PN>PN1 are not all satisfied ("No," step 550'), access node 110 may perform step 570. If DF2>DF>DF1, CFO2>CFO>CFO1, TO2>TO>TO1, and PN2>PN>PN1 are all satisfied ("Yes," step 550'), access node 110 may perform step 560.

In some embodiments, in step 520', access node 110 may determine whether DF>DF1, CFO>CFO1, TO>TO1, and IM>IM1 are all satisfied. If DF>DF1, CFO>CFO1, TO>TO1, and IM>IM1 are not all satisfied ("No," step 520'), access node 110 may perform step 530. If DF>DF1, CFO>CFO1, TO>TO1, and IM>IM1 are all satisfied ("Yes," step 520'), access node 110 may perform step 550'. In step 550', access node 110 may determine whether DF2>DF>DF1, CFO2>CFO>CFO1, TO2>TO>TO1, and IM2>IM>IM1 are all satisfied. If DF2>DF>DF1, CFO2>CFO>CFO1, TO2>TO>TO1, and IM2>IM>IM1 are not all satisfied ("No," step 550'), access node 110 may perform step 570. If DF2>DF>DF1, CFO2>CFO>CFO1, TO2>TO>TO1, and IM2>IM>IM1 are all satisfied ("Yes," step 550'), access node 110 may perform step 560.

In some embodiments, in step 520', access node 110 may determine whether DF>DF1, CFO>CFO1, TO>TO1, and LT<LT1 are all satisfied. If DF>DF1, CFO>CFO1, TO>TO1, and LT<LT1 are not all satisfied ("No," step 520'), access node 110 may perform step 530. If DF>DF1, CFO>CFO1, TO>TO1, and LT<LT1 are all satisfied ("Yes," step 520'), access node 110 may perform step 550'. In step 550', access node 110 may determine whether DF2>DF>DF1, CFO2>CFO>CFO1, TO2>TO>TO1, and LT2<LT<LT1 are all satisfied. If DF2>DF>DF1, CFO2>CFO>CFO1, TO2>TO>TO1, and LT2<LT<LT1 are not all satisfied ("No," step 550'), access node 110 may perform step 570. If DF2>DF>DF1, CFO2>CFO>CFO1, TO2>TO>TO1, and LT2<LT<LT1 are all satisfied ("Yes," step 550'), access node 110 may perform step 560.

In some embodiments, in step 520', access node 110 may determine whether DF>DF1, CFO>CFO1, TO>TO1, PN>PN1, and IM>IM1 are all satisfied. If DF>DF1, CFO>CFO1, TO>TO1, PN>PN1, and IM>IM1 are not all satisfied ("No," step 520'), access node 110 may perform step 530. If DF>DF1, CFO>CFO1, TO>TO1, PN>PN1, and IM>IM1 are all satisfied ("Yes," step 520'), access node 110 may perform step 550'. In step 550', access node 110 may determine whether DF2>DF>DF1, CFO2>CFO>CFO1, TO2>TO>TO1, PN2>PN>PN1, and IM2>IM>IM1 are all satisfied. If DF2>DF>DF1, CFO2>CFO>CFO1, TO2>TO>TO1, PN2>PN>PN1, and IM2>IM>IM1 are not all satisfied ("No," step 550'), access node 110 may perform step 570. If DF2>DF>DF1, CFO2>CFO>CFO1, TO2>TO>TO1, PN2>PN>PN1, and IM2>IM>IM1 are all satisfied ("Yes," step 550'), access node 110 may perform step 560.

In some embodiments, in step 520', access node 110 may determine whether DF>DF1, CFO>CFO1, TO>TO1, PN>PN1, and LT<LT1 are all satisfied. If DF>DF1, CFO>CFO1, TO>TO1, PN>PN1, and LT<LT1 are not all satisfied ("No," step 520'), access node 110 may perform step 530. If DF>DF1, CFO>CFO1, TO>TO1, PN>PN1, and LT<LT1 are all satisfied ("Yes," step 520'), access node 110 may perform step 550'. In step 550', access node 110 may determine whether DF2>DF>DF1, CFO2>CFO>CFO1, TO2>TO>TO1, PN2>PN>PN1, and LT2<LT<LT1 are all satisfied. If DF2>DF>DF1, CFO2>CFO>CFO1, TO2>TO>TO1, PN2>PN>PN1, and LT2<LT<LT1 are not all satisfied ("No," step 550'), access node 110 may perform step 570. If DF2>DF>DF1, CFO2>CFO>CFO1, TO2>TO>TO1, PN2>PN>PN1, and LT2<LT<LT1 are all satisfied ("Yes," step 550'), access node 110 may perform step 560.

In some embodiments, in step 520', access node 110 may determine whether DF>DF1, CFO>CFO1, TO>TO1, PN>PN1, IM>IM1, and LT<LT1 are all satisfied. If DF>DF1, CFO>CFO1, TO>TO1, PN>PN1, IM>IM1, and LT<LT1 are not all satisfied ("No," step 520'), access node 110 may perform step 530. If DF>DF1, CFO>CFO1, TO>TO1, PN>PN1, IM>IM1, and LT<LT1 are all satisfied ("Yes," step 520'), access node 110 may perform step 550'. In step 550', access node 110 may determine whether DF2>DF>DF1, CFO2>CFO>CFO1, TO2>TO>TO1, PN2>PN>PN1, IM2>IM>IM1, and LT2<LT<LT1 are all satisfied. If DF2>DF>DF1, CFO2>CFO>CFO1, TO2>TO>TO1, PN2>PN>PN1, IM2>IM>IM1, and LT2<LT<LT1 are not all satisfied ("No," step 550'), access node 110 may perform step 570. If DF2>DF>DF1, CFO2>CFO>CFO1, TO2>TO>TO1, PN2>PN>PN1, IM2>IM>IM1, and LT2<LT<LT1 are all satisfied ("Yes," step 550'), access node 110 may perform step 560.

In some embodiments, the modified portions shown in FIG. 6 and FIG. 7 may be combined. For example, instead of performing step 570 in FIG. 7, access node 110 may perform steps similar to steps 555, 571, and 572, with step 555 being modified to require the same two or more parameters used in step 550' to satisfy the listed conditions DF2<=DF<DF3, CFO2<=CFO<CFO3, TO2<=TO<TO3, PN2<=PN<PN3, IM2<=IM<IM3, and LT3<LT<=LT2. Depending on the determination in step 555, access node 110 may perform step 571 or step 572.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for selecting a sub-carrier spacing, comprising:
    an access node configured to deploy a radio air interface to provide wireless services to a plurality of wireless devices, the access node comprising:
        a processor configured to:
            determine a value of a radio frequency impairment, wherein the radio frequency impairment comprises at least one of a carrier frequency offset, a timing offset, a phase noise, and an IQ mismatch;
            compare the value of the radio frequency impairment with a predetermined threshold; and
            select the sub-carrier spacing from a plurality of sub-carrier spacings based on a result of the comparison, wherein
            a third sub-carrier spacing from the plurality of sub-carrier spacings is selected when the radio frequency impairment is greater than or equal to a second predetermined radio frequency impairment threshold, and
            wherein a first sub-carrier spacing is narrower than a second sub-carrier spacing, and the second sub-carrier spacing is narrower than the third sub-carrier spacing.

2. The system of claim 1, wherein selecting the sub-carrier spacing comprises:
    selecting the first sub-carrier spacing from the plurality of sub-carrier spacings when a Doppler frequency shift effect is less than or equal to a first predetermined Doppler frequency shift effect threshold;
    selecting the second sub-carrier spacing from the plurality of sub-carrier spacings when the Doppler frequency shift effect is greater than the first predetermined Doppler frequency shift effect threshold, and less than a second predetermined Doppler frequency shift effect threshold; and
    selecting the third sub-carrier spacing from the plurality of sub-carrier spacings when the Doppler frequency shift effect is greater than or equal to the second predetermined Doppler frequency shift effect threshold.

3. The system of claim 1, wherein selecting the sub-carrier spacing comprises:
    selecting the first sub-carrier spacing from the plurality of sub-carrier spacings when the carrier frequency offset is less than or equal to a first predetermined carrier frequency offset threshold;
    selecting the second sub-carrier spacing from the plurality of sub-carrier spacings when the carrier frequency offset is greater than the first predetermined carrier frequency offset threshold, and less than a second predetermined carrier frequency offset threshold; and
    selecting the third sub-carrier spacing from the plurality of sub-carrier spacings when the carrier frequency offset is greater than or equal to the second predetermined carrier frequency offset threshold.

4. The system of claim 1, wherein selecting the sub-carrier spacing comprises:
    selecting the first sub-carrier spacing from the plurality of sub-carrier spacings when the timing offset is less than or equal to a first predetermined timing offset threshold;
    selecting the second sub-carrier spacing from the plurality of sub-carrier spacings when the timing offset is greater than the first predetermined timing offset threshold, and less than a second predetermined timing offset threshold; and
    selecting the third sub-carrier spacing from the plurality of sub-carrier spacings when the timing offset is greater than or equal to the second predetermined timing offset threshold.

5. The system of claim 1, wherein selecting the sub-carrier spacing comprises:
    selecting the first sub-carrier spacing from the plurality of sub-carrier spacings when the phase noise is less than or equal to a first predetermined phase noise threshold;
    selecting the second sub-carrier spacing from the plurality of sub-carrier spacings when the phase noise is greater than the first predetermined phase noise threshold, and less than a second predetermined phase noise threshold; and
    selecting the third sub-carrier spacing from the plurality of sub-carrier spacings when the phase noise is greater than or equal to the second predetermined phase noise threshold.

6. The system of claim 1, wherein selecting the sub-carrier spacing comprises:
    selecting the first sub-carrier spacing from the plurality of sub-carrier spacings when the IQ mismatch is less than or equal to a first predetermined IQ mismatch threshold;
    selecting the second sub-carrier spacing from the plurality of sub-carrier spacings when the IQ mismatch is greater than the first predetermined IQ mismatch threshold, and less than a second predetermined IQ mismatch threshold; and
    selecting the third sub-carrier spacing from the plurality of sub-carrier spacings when the IQ mismatch is greater than or equal to the second predetermined IQ mismatch threshold.

7. The system of claim 1, wherein selecting the sub-carrier spacing comprises:
    selecting the first sub-carrier spacing from the plurality of sub-carrier spacings when a latency level is greater than or equal to a first predetermined latency threshold;

selecting the second sub-carrier spacing from the plurality of sub-carrier spacings when the latency level is less than the first predetermined latency threshold, and greater than a second predetermined latency threshold; and selecting the third sub-carrier spacing from the plurality of sub-carrier spacings when the latency level is less than or equal to the second predetermined latency threshold.

8. The system of claim 1, wherein selecting the sub-carrier spacing comprises:

selecting the first sub-carrier spacing when the value of the radio frequency impairment is less than or equal to a first predetermined radio frequency impairment threshold; and selecting the second sub-carrier spacing when the value of the radio frequency impairment is greater than the first predetermined radio frequency impairment threshold and less than a second predetermined radio frequency impairment threshold.

9. The system of claim 1, wherein the first sub-carrier spacing is 15 kHz, the second sub-carrier spacing is 30 kHz, and the third sub-carrier spacing is 60 kHz or 120 kHz.

10. A method for selecting a sub-carrier spacing, comprising:

determining a value of a radio frequency impairment, wherein the radio frequency impairment comprises at least one of a carrier frequency offset, a timing offset, a phase noise, and an IQ mismatch;

comparing the value of the radio frequency impairment with a predetermined threshold; and selecting the sub-carrier spacing from a plurality of sub-carrier spacings based on a result of the comparison, wherein a third sub-carrier spacing from the plurality of sub-carrier spacings is selected when the radio frequency impairment is greater than or equal to a second predetermined radio frequency impairment threshold, and wherein a first sub-carrier spacing is narrower than a second sub-carrier spacing, and the second sub-carrier spacing is narrower than the third sub-carrier spacing.

11. The method of claim 10, wherein selecting the sub-carrier spacing comprises:

selecting the first sub-carrier spacing from the plurality of sub-carrier spacings when a Doppler frequency shift effect is less than or equal to a first predetermined Doppler frequency shift effect threshold;

selecting the second sub-carrier spacing from the plurality of sub-carrier spacings when the Doppler frequency shift effect is greater than the first predetermined Doppler frequency shift effect threshold, and less than a second predetermined Doppler frequency shift effect threshold; and selecting the third sub-carrier spacing from the plurality of sub-carrier spacings when the Doppler frequency shift effect is greater than or equal to the second predetermined Doppler frequency shift effect threshold.

12. The method of claim 10, wherein selecting the sub-carrier spacing comprises:

selecting the first sub-carrier spacing from the plurality of sub-carrier spacings when the carrier frequency offset is less than or equal to a first predetermined carrier frequency offset threshold;

selecting the second sub-carrier spacing from the plurality of sub-carrier spacings when the carrier frequency offset is greater than the first predetermined carrier frequency offset threshold, and less than a second predetermined carrier frequency offset threshold; and selecting the third sub-carrier spacing from the plurality of sub-carrier spacings when the carrier frequency offset is greater than or equal to the second predetermined carrier frequency offset threshold.

13. The method of claim 10, wherein selecting the sub-carrier spacing comprises:

selecting the first sub-carrier spacing from the plurality of sub-carrier spacings when the timing offset is less than or equal to a first predetermined timing offset threshold;

selecting the second sub-carrier spacing from the plurality of sub-carrier spacings when the timing offset is greater than the first predetermined timing offset threshold, and less than a second predetermined timing offset threshold; and selecting the third sub-carrier spacing from the plurality of sub-carrier spacings when the timing offset is greater than or equal to the second predetermined timing offset threshold.

14. The method of claim 10, wherein selecting the sub-carrier spacing comprises:

selecting the first sub-carrier spacing from the plurality of sub-carrier spacings when the phase noise is less than or equal to a first predetermined phase noise threshold;

selecting the second sub-carrier spacing from the plurality of sub-carrier spacings when the phase noise is greater than the first predetermined phase noise threshold, and less than a second predetermined phase noise threshold; and selecting the third sub-carrier spacing from the plurality of sub-carrier spacings when the phase noise is greater than or equal to the second predetermined phase noise threshold.

15. The method of claim 10, wherein selecting the sub-carrier spacing comprises:

selecting the first sub-carrier spacing from the plurality of sub-carrier spacings when the IQ mismatch is less than or equal to a first predetermined IQ mismatch threshold;

selecting the second sub-carrier spacing from the plurality of sub-carrier spacings when the IQ mismatch is greater than the first predetermined IQ mismatch threshold, and less than a second predetermined IQ mismatch threshold; and selecting the third sub-carrier spacing from the plurality of sub-carrier spacings when the IQ mismatch is greater than or equal to the second predetermined IQ mismatch threshold.

16. The method of claim 10, wherein selecting the sub-carrier spacing comprises:

selecting the first sub-carrier spacing from the plurality of sub-carrier spacings when a latency level is greater than or equal to a first predetermined latency threshold;

selecting the second sub-carrier spacing from the plurality of sub-carrier spacings when the latency level is less than the first predetermined latency threshold, and greater than a second predetermined latency threshold; and selecting the third sub-carrier spacing from the plurality of sub-carrier spacings when the latency level is less than or equal to the second predetermined latency threshold.

17. The method of claim 10, wherein selecting the sub-carrier spacing comprises:

selecting the first sub-carrier spacing when the value of the radio frequency impairment is less than or equal to a first predetermined radio frequency impairment threshold;

selecting the second sub-carrier spacing when the value of the radio frequency impairment is greater than the first predetermined radio frequency impairment threshold and less than the second predetermined radio frequency impairment threshold; and wherein the first sub-carrier spacing is 15 kHz, the second sub-carrier spacing is 30 kHz, and the third sub-carrier spacing is 60 kHz or 120 kHz.

18. A processing node for selecting a sub-carrier spacing, the processing node comprising a processor configured to perform operations comprising:

determining a value of a radio frequency impairment, wherein the radio frequency impairment comprises at least one of a carrier frequency offset, a timing offset, a phase noise, and an IQ mismatch;

comparing the value of the radio frequency impairment with a predetermined threshold; and selecting the sub-carrier spacing from a plurality of sub-carrier spacings based on a result of the comparison, wherein a third sub-carrier spacing from the plurality of sub-carrier spacings is selected when the radio frequency impairment is greater than or equal to a second predetermined radio frequency impairment threshold, and wherein a first sub-carrier spacing is narrower than a second sub-carrier spacing, and the second sub-carrier spacing is narrower than the third sub-carrier spacing.

* * * * *